US007386846B2

(12) United States Patent  
Rajaram

(10) Patent No.: US 7,386,846 B2
(45) Date of Patent: *Jun. 10, 2008

(54) SYSTEM AND METHOD FOR THE MANAGEMENT OF WIRELESS COMMUNICATIONS DEVICE SYSTEM SOFTWARE DOWNLOADS IN THE FIELD

(75) Inventor: Gowri Rajaram, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 724 days.

This patent is subject to a terminal disclaimer.

(21) Appl. No.: 09/969,305

(22) Filed: Oct. 2, 2001

(65) Prior Publication Data

US 2003/0064717 A1 Apr. 3, 2003
US 2005/0026603 A9 Feb. 3, 2005

Related U.S. Application Data

(63) Continuation-in-part of application No. 09/927,131, filed on Aug. 10, 2001, and a continuation-in-part of application No. 09/916,900, filed on Jul. 26, 2001, and a continuation-in-part of application No. 09/916,460, filed on Jul. 26, 2001.

(51) Int. Cl.
*G06F 9/44* (2006.01)
(52) U.S. Cl. .................... 717/173; 717/126
(58) Field of Classification Search ............ 717/173, 717/106, 172; 455/419; 714/31; 711/15; 709/248, 224, 204; 465/419; 705/50
See application file for complete search history.

(56) References Cited

U.S. PATENT DOCUMENTS 5,046,082 A   9/1991  Zicker et al.
5,337,255 A   8/1994  Seidel et al.
5,400,389 A   3/1995  Niiyama et al.
5,481,706 A   1/1996  Peek
5,507,009 A   4/1996  Grube et al.
5,600,823 A   2/1997  Sherer et al.
5,673,317 A   9/1997  Cooper
5,699,275 A * 12/1997  Beasley et al. ............. 709/221
5,715,462 A   2/1998  Iwamoto et al.

(Continued)

FOREIGN PATENT DOCUMENTS

DE    19502728    8/1996

(Continued)

OTHER PUBLICATIONS

International Search Report (ISR): PCT/ISA/210 for International Application No. PCT/IB02/02875, ISR dated Oct. 28, 2003, 4 pages.

(Continued)

*Primary Examiner*—Wei Zhen
*Assistant Examiner*—Chih-Ching Chow

(57) ABSTRACT

A system and method are provided for managing system software download operations in a wireless communications device. The method comprises: executing system software; launching a run-time engine; processing dynamic instruction sets; and, in response to processing the dynamic instruction sets, managing the downloading of system software updates received via an airlink interface using management functions selected from the group including recovery status monitoring, back up, compacting, and update ordering.

37 Claims, 24 Drawing Sheets

U.S. PATENT DOCUMENTS

| | | | |
|---|---|---|---|
| 5,734,904 A | 3/1998 | Kanamori et al. | |
| 5,771,386 A | 6/1998 | Baumbauer | |
| 5,784,537 A | 7/1998 | Suzuki et al. | |
| 5,790,704 A * | 8/1998 | Rao et al. | 382/237 |
| 5,790,856 A * | 8/1998 | Lillich | 717/163 |
| 5,832,086 A | 11/1998 | Rosauer | |
| 5,835,778 A | 11/1998 | Yoshihara | |
| 5,875,242 A * | 2/1999 | Glaser et al. | 379/201.05 |
| 5,920,826 A | 7/1999 | Metso et al. | |
| 5,930,704 A * | 7/1999 | Kay | 455/419 |
| 5,938,766 A | 8/1999 | Anderson et al. | |
| 5,960,356 A | 9/1999 | Alperovich et al. | |
| 5,974,312 A | 10/1999 | Hayes et al. | |
| 6,018,543 A | 1/2000 | Blois et al. | |
| 6,023,620 A * | 2/2000 | Hansson | 455/419 |
| 6,026,400 A | 2/2000 | Suzuki | |
| 6,047,071 A | 4/2000 | Shah | |
| 6,138,009 A | 10/2000 | Birgerson | |
| 6,138,153 A | 10/2000 | Collins et al. | |
| 6,145,098 A * | 11/2000 | Nouri et al. | 714/31 |
| 6,195,546 B1 | 2/2001 | Leung et al. | |
| 6,247,065 B1 | 6/2001 | Greenspan et al. | |
| 6,272,333 B1 | 8/2001 | Smith | |
| 6,275,694 B1 | 8/2001 | Yoshida et al. | |
| 6,308,061 B1 | 10/2001 | Criss et al. | |
| 6,351,636 B2 | 2/2002 | Shaffer et al. | |
| 6,415,266 B1 | 7/2002 | Do | |
| 6,442,660 B1 * | 8/2002 | Henerlau et al. | 711/165 |
| 6,449,476 B1 * | 9/2002 | Hutchison et al. | 455/418 |
| 6,457,174 B1 | 9/2002 | Kuroda et al. | |
| 6,460,070 B1 | 10/2002 | Turek et al. | |
| 6,470,447 B1 | 10/2002 | Lambert et al. | |
| 6,493,549 B1 | 12/2002 | Axelson et al. | |
| 6,493,871 B1 * | 12/2002 | McGuire et al. | 717/173 |
| 6,498,789 B1 | 12/2002 | Honda | |
| 6,546,492 B1 | 4/2003 | Walker et al. | |
| 6,549,770 B1 | 4/2003 | Marran | |
| 6,578,056 B1 | 6/2003 | Lamburt | |
| 6,578,142 B1 * | 6/2003 | Anderson et al. | 713/2 |
| 6,622,017 B1 | 9/2003 | Hoffman | |
| 6,633,759 B1 | 10/2003 | Kobayashi | |
| 6,643,506 B1 | 11/2003 | Criss et al. | |
| 6,675,382 B1 * | 1/2004 | Foster | 717/177 |
| 6,714,992 B1 | 3/2004 | Kanojia et al. | |
| 6,731,946 B1 | 5/2004 | Stanwood et al. | |
| 6,754,894 B1 * | 6/2004 | Costello et al. | 717/169 |
| 6,754,895 B1 | 6/2004 | Bartel et al. | |
| 6,763,252 B2 | 7/2004 | Itazawa | |
| 6,785,541 B2 | 8/2004 | Martin | |
| 6,918,108 B2 * | 7/2005 | Rajaram | 717/126 |
| 6,950,847 B2 * | 9/2005 | Harrisville-Wolff et al. | 709/201 |
| 6,959,192 B1 | 10/2005 | Cannon et al. | |
| 6,990,660 B2 * | 1/2006 | Moshir et al. | 717/171 |
| 7,065,347 B1 * | 6/2006 | Vikse et al. | 455/419 |
| 2001/0000538 A1 | 4/2001 | Kowaguchi | |
| 2001/0005861 A1 | 6/2001 | Mousseau et al. | |
| 2001/0019953 A1 | 9/2001 | Furukawa et al. | |
| 2001/0027500 A1 | 10/2001 | Matsunaga | |
| 2001/0051519 A1 | 12/2001 | Shirai | |
| 2001/0054161 A1 | 12/2001 | Wooddruff | |
| 2002/0019973 A1 * | 2/2002 | Hayashida | 717/106 |
| 2002/0026634 A1 | 2/2002 | Shaw | |
| 2002/0065041 A1 | 5/2002 | Lunsford et al. | |
| 2002/0072359 A1 | 6/2002 | Moles et al. | |
| 2002/0077077 A1 | 6/2002 | Rezvani et al. | |
| 2002/0083142 A1 | 6/2002 | Lagosanto et al. | |
| 2002/0083143 A1 | 6/2002 | Cheng | |
| 2002/0131397 A1 | 9/2002 | Patel et al. | |
| 2002/0142762 A1 | 10/2002 | Chmaytelli et al. | |
| 2002/0152268 A1 | 10/2002 | Kureshy et al. | |
| 2002/0160763 A1 | 10/2002 | Mittal et al. | |
| 2002/0161796 A1 | 10/2002 | Sylthe | |
| 2002/0170039 A1 | 11/2002 | Kovacevic | |
| 2002/0188941 A1 * | 12/2002 | Cicciarelli et al. | 717/175 |
| 2003/0014561 A1 | 1/2003 | Cooper | |
| 2003/0060189 A1 | 3/2003 | Minear et al. | |
| 2003/0195013 A1 | 10/2003 | Zicker et al. | |
| 2004/0158829 A1 | 8/2004 | Beresin et al. | |
| 2004/0177072 A1 | 9/2004 | Salminen et al. | |
| 2004/0203768 A1 | 10/2004 | Ylitalo et al. | |
| 2004/0214551 A1 | 10/2004 | Kim | |
| 2004/0229644 A1 | 11/2004 | Hele et al. | |
| 2004/0240657 A1 | 12/2004 | Camarillo | |
| 2004/0249657 A1 | 12/2004 | Kol et al. | |
| 2004/0249768 A1 | 12/2004 | Kontio et al. | |
| 2004/0266422 A1 | 12/2004 | Hotze et al. | |
| 2005/0064087 A1 | 3/2005 | Kirbas et al. | |
| 2005/0079863 A1 | 4/2005 | Macaluso | |
| 2005/0209930 A1 | 9/2005 | Coppinger et al. | |

FOREIGN PATENT DOCUMENTS

| | | |
|---|---|---|
| DE | 19543843 | 5/1997 |
| DE | 19850133 | 5/1999 |
| EP | 0459344 | 12/1991 |
| EP | 0889405 | 1/1999 |
| EP | 0918420 | 5/1999 |
| EP | 1014263 | 6/2000 |
| FR | 2800963 | 5/2001 |
| GB | 2227584 | 8/1990 |
| GB | 2349485 | 11/2000 |
| WO | WO 9300633 | 1/1993 |
| WO | WO 98/09208 | 3/1998 |
| WO | WO 9922325 | 5/1999 |
| WO | WO 0067112 | 11/2000 |
| WO | WO 0073912 | 12/2000 |
| WO | WO 0074412 | 12/2000 |
| WO | WO 0135686 | 5/2001 |
| WO | WO 02058364 | 7/2002 |

OTHER PUBLICATIONS

Guiagoussou et al., "Implementation of a Diagnostic and Troubleshooting Multi-Agent System for Cellular Networks", Int'l J Network Mgmnt., pp. 221-237, Aug. 1999.

* cited by examiner

326

| CODE SECTION ADDRESS TABLE ||
|---|---|
| IDENTIFIERS | ADDRESSES |
| CS_1 | START ADDRESS 1 (00100) |
| CS_2 | START ADDRESS 2 (00200) |
| ⋮ | ⋮ |
| CS_N | START ADDRESS N (00700) |
| PM | START ADDRESS P (01000) |

FIG. 5

| | 0 | 1 | 2 | 3 | 4 | 5 | 6 | 7 |
|---|---|---|---|---|---|---|---|---|
| 0 | | | | X | | | | |
| 1 | | | | | | Y | | |
| ⋮ | | | | ⋮ | | | | |
| n | | | | | Z | | | |

SYMBOL LIBRARY 1

| SYMBOL OFFSET ADDRESS TABLE | | |
|---|---|---|
| SYMBOL ID | CODE SECTION ID | OFFSET |
| X_1 | CS_1 | 03 |
| Y_1 | CS_1 | 15 |
| P_1 | CS_2 | 11 |
| Q_1 | CS_2 | 33 |
| AA_3 | CS_2 | 47 |
| ⋮ | | |

FIG. 7

SYSTEM AND METHOD FOR THE MANAGEMENT OF WIRELESS COMMUNICATIONS DEVICE SYSTEM SOFTWARE DOWNLOADS IN THE FIELD

RELATED APPLICATIONS

This application is a continuation-in-part of U.S. patent application Ser. No. 09/916,900, filed on Jul. 26, 2001; of U.S. patent application Ser. No. 09/916,460, filed on Jul. 26, 2001; and of U.S. patent aApplication Ser. No. 09/927,131, filed on Aug. 10, 2001, all of which are incorporated herein by reference. Additionally, this application is related to U.S. application Ser. No. 09/917,026, filed on Jul. 26, 2001; U.S. application Ser. No. 09/970 188, filed on Oct. 3, 2001; U.S. application Ser. No. 09/972,519, filed on Oct. 5, 2001; U.S. application Ser. No. 10/206,780, filed on Jul. 25, 2002; U.S. application Ser. No. 10/206,516, filed on Jul. 25, 2002; U.S. application Ser. No. 10/206,781, filed on Jul. 25, 2002; U.S. application Ser. No. 10/665,962, filed on Sep. 18, 2003; U.S. application Ser. No. 10/848,939, filed on May 18, 2004; U.S. application Ser. No. 10/848,940, filed on May 18, 2004; and U.S. application Ser. No. 10/848,941, filed on May 18, 2004.

FIELD OF THE INVENTION

This invention generally relates to wireless communications devices and, more particularly, to a system and method for using dynamic instructions sets to manage a variety of system software field download management functions, such as recovery status monitoring, back up, compaction, and update ordering.

BACKGROUND OF THE INVENTION

It is not uncommon to release software updates for phones that are already in the field. These updates may relate to problems found in the software once the phones have been manufactured and distributed to the public. Some updates may involve the use of new features on the phone, or services provided by the service provider. Yet other updates may involve regional problems, or problems associated with certain carriers. For example, in certain regions the network layout of carriers may impose airlink interface conditions on the handset that cause the handset to demonstrate unexpected behavior such as improper channel searching, improper call termination, improper audio, or the like.

The traditional approach to such updates has been to recall the wireless communications device, also referred to herein as a wireless device, phone, telephone, or handset, to the nearest carrier retail/service outlet, or to the manufacturer to process the changes. The costs involved in such updates are extensive and eat into the bottom line. Further, the customer is inconvenienced and likely to be irritated. Often times, the practical solution is to issue the customer new phones.

The wireless devices are used in a number of environments, with different subscriber services, for a number of different customer applications. Therefore, even if the software of a wireless device can be upgraded to improve service, it is unlikely that the upgrade will provide a uniform improvement for all users.

It would be advantageous if wireless communications device software could be upgraded cheaply, and without inconvenience to the customer.

It would be advantageous if wireless communications device software could be upgraded without the customer losing the use of their phones for a significant period of time.

It would be advantageous if wireless communications device software could be updated with a minimum of technician service time, or without the need to send the device into a service facility.

It would be advantageous if the wireless device system software could be differentiated into code sections, so that only specific code sections of system software would need to be replaced, to update the system software. It would be advantageous if these code sections could be communicated to the wireless device via the airlink.

It would be advantageous if the wireless device could be operated with dynamically loaded instruction sets that would aid in the field updating of system software.

It would be advantageous if these dynamic instruction sets could protect the wireless device from update errors by monitoring the update status, backing up key code sections, performing memory compaction, and ordering the update storage process.

SUMMARY OF THE INVENTION

Wireless communications device software updates give customers the best possible product and user experience. An expensive component of the business involves the recall of handsets to update the software. These updates may be necessary to offer the user additional services or to address problems discovered in the use of the phone after it has been manufactured. The present invention makes it possible to practically upgrade handset software in the field, via the airlink interface. More specifically, the present invention permits the wireless communication device to execute dynamic instruction sets. These dynamic instruction sets permit the wireless device to "intelligently", or conditionally upgrade the system software and system data. Further, the dynamic instruction sets permit the wireless device to determine if the updating process has been successfully completed. The dynamic instruction sets permit key code sections to be stored in case the upgrade section are found to be non-operational. The dynamic instruction sets also perform memory compaction and storage ordering.

Accordingly, a method is provided for managing system software download operations in a wireless communications device. The method comprises: executing system software; launching a run-time engine; processing dynamic instruction sets; and, in response to processing the dynamic instruction sets, managing the downloading of system software updates received via an airlink interface using management functions selected from the group including recovery status monitoring, back up, compacting, and update ordering.

Details of the above-described recovery status monitoring, back up, compacting, and update ordering management functions, and a system for managing system software download operations in a wireless communications device are provided below.

BRIEF DESCRIPTION OF THE DRAWING

FIG. 5 is a table representing the code section address table of FIG. 3.

FIG. 6 is a detailed depiction of symbol library one of FIG. 3, with symbols.

FIG. 7 is a table representing the symbol offset address table of FIG. 3.

DETAILED DESCRIPTION OF THE PREFERRED EMBODIMENTS

Some portions of the detailed descriptions that follow are presented in terms of procedures, steps, logic blocks, codes, processing, and other symbolic representations of operations on data bits within a wireless device microprocessor or memory. These descriptions and representations are the means used by those skilled in the data processing arts to most effectively convey the substance of their work to others skilled in the art. A procedure, microprocessor executed step, application, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a microprocessor based wireless device. It has proven convenient at times, principally for reasons of common usage, to refer to these signals as bits, values, elements, symbols, characters, terms, numbers, or the like. Where physical devices, such as a memory are mentioned, they are connected to other physical devices through a bus or other electrical connection. These physical devices can be considered to interact with logical processes or applications and, therefore, are "connected" to logical operations. For example, a memory can store or access code to further a logical operation, or an application can call a code section from memory for execution.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "connecting" or "translating" or "displaying" or "prompting" or "determining" or "displaying" or "recognizing" or the like, refer to the action and processes of in a wireless device microprocessor system that manipulates and transforms data represented as physical (electronic) quantities within the computer system's registers and memories into other data similarly represented as physical quantities within the wireless device memories or registers or other such information storage, transmission or display devices.

Figure 1:
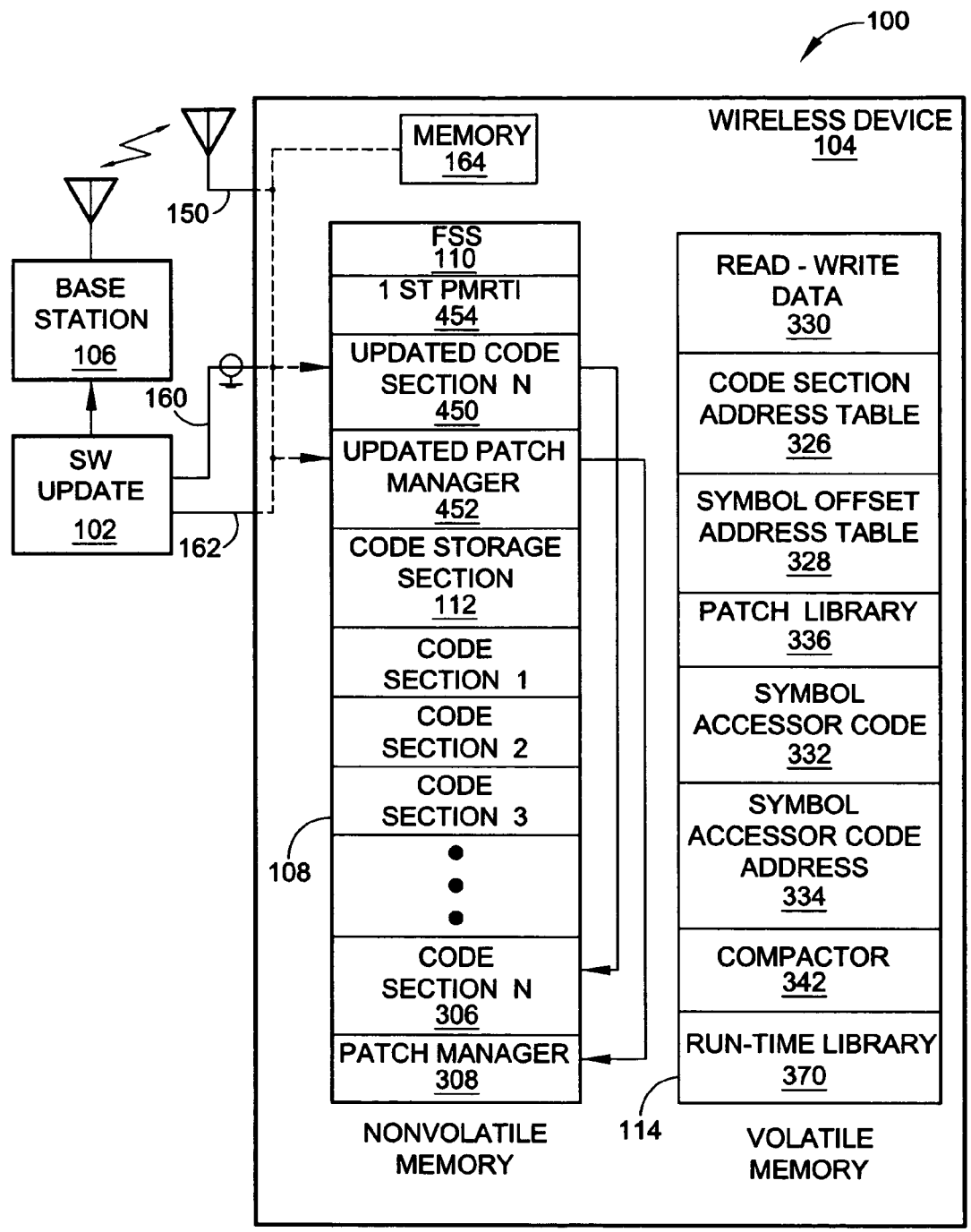
FIG. 1 is a schematic block diagram of the overall wireless device software maintenance system.

FIG. 1 is a schematic block diagram of the overall wireless device software maintenance system 100. The present invention system software organization is presented in detail below, following a general overview of the software maintenance system 100. The general system 100 describes a process of delivering system software updates and instruction sets (programs), and installing the delivered software in a wireless device. System software updates and patch manager run time instructions (PMRTI), that are more generally known as instruction sets or dynamic instruction sets, are created by the manufacturer of the handsets. The system software is organized into symbol libraries. The symbol libraries are arranged into code sections. When symbol libraries are to be updated, the software update 102 is transported as one or more code sections. The software update is broadcast to wireless devices in the field, of which wireless communications device 104 is representative, or transmitted in separate communications from a base station 106 using well known, conventional air, data or message transport protocols. The invention is not limited to any particular transportation format, as the wireless communications device can be easily modified to process any available over-the-air transport protocol for the purpose of receiving system software and PMRTI updates.

The system software can be viewed as a collection of different subsystems. Code objects can be tightly coupled into one of these abstract subsystems and the resulting collection can be labeled as a symbol library. This provides a logical breakdown of the code base and software patches and fixes can be associated with one of these symbol libraries. In most cases, a single update is associated with one, or at most, two symbol libraries. The rest of the code base, the other symbol libraries, remains unchanged.

The notion of symbol libraries provides a mechanism to deal with code and constants. The read-write (RW) data, on the other hand, fits into a unique individual RW library that contains RAM based data for all libraries.

Once received by the wireless device 104, the transported code section must be processed. This wireless device overwrites a specific code section of nonvolatile memory 108. The nonvolatile memory 108 includes a file system section (FSS) 110 and a code storage section 112. The code section is typically compressed before transport in order to minimize occupancy in the FSS 110. Often the updated code section will be accompanied by its RW data, which is another kind of symbol library that contains all the RW data for each symbol library. Although loaded in random access volatile read-write memory 114 when the system software is executing, the RW data always needs to be stored in the nonvolatile memory 108, so it can be loaded into random access volatile read-write memory 114 each time the wireless device is reset. This includes the first time RW data is loaded into random access volatile read-write memory. As explained in more detail below, the RW data is typically arranged with a patch manager code section.

The system 100 includes the concept of virtual tables. Using such tables, symbol libraries in one code section can be patched (replaced), without breaking (replacing) other parts of the system software (other code sections). Virtual tables execute from random access volatile read-write memory 114 for efficiency purposes. A code section address table and symbol offset address table are virtual tables.

The updated code sections are received by the wireless device 104 and stored in the FSS 110. A wireless device user interface (UI) will typically notify the user that new software is available. In response to UI prompts the user acknowledges the notification and signals the patching or updating operation. Alternately, the updating operation is performed automatically. The wireless device may be unable to perform standard communication tasks as the updating process is performed. The patch manager code section includes a nonvolatile read-write driver symbol library that is also loaded into random access volatile read-write memory 114. The non-volatile read-write driver symbol library causes code sections to be overwritten with updated code sections. The patch manager code section includes the read-write data, code section address table, and symbol offset address table, as well a symbol accessor code and the symbol accessor code address (discussed below). Portions of this data are invalid when updated code sections are introduced, and an updated patch manager code sections includes read-write data, a code section address table, and a symbol offset address table valid for the updated code sections. Once the updated code sections are loaded into the code storage section 112, the wireless device is reset. Following the reset operation, the wireless device can execute the updated system software. It should also be understood that the patch manager code section may include other symbol libraries that have not been discussed above. These other symbol libraries need not be loaded into read-write volatile memory 114.

Figure 2:
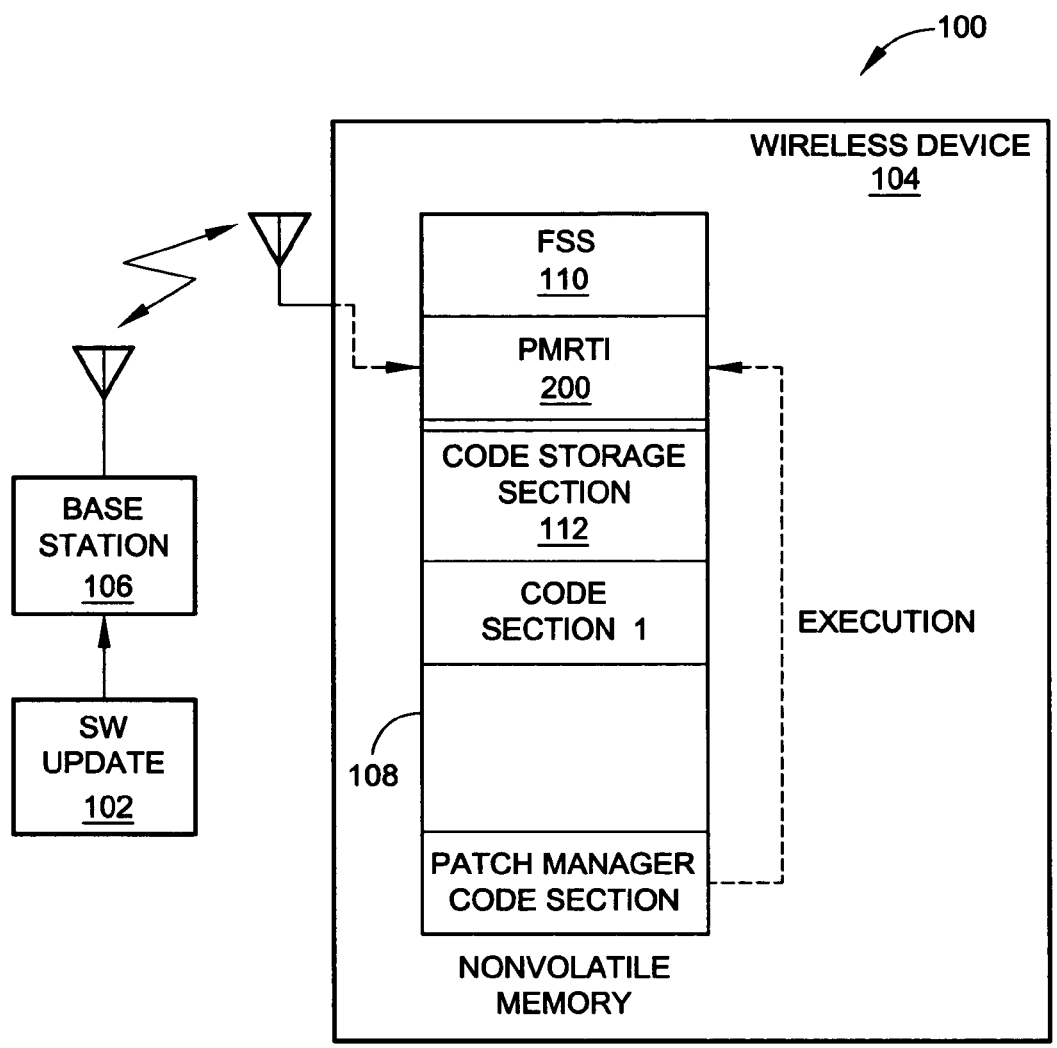
FIG. 2 is a schematic block diagram of the software maintenance system, highlighting the installation of instruction sets via the airlink interface.

FIG. 2 is a schematic block diagram of the software maintenance system 100, highlighting the installation of instruction sets via the airlink interface. In addition to updating system software code sections, the maintenance system 100 can download and install dynamic instructions sets, programs, or patch manager instruction sets (PMIS), referred to herein as patch manager run time instructions (PMRTI). The PMRTI code section 200 is transported to the wireless device 104 in the same manner as the above-described system software code sections. PMRTI code sections are initially stored in the FSS 110. A PMRTI code section is typically a binary file that may be visualized as compiled instructions to the handset. A PMRTI code section is comprehensive enough to provide for the performance of basic mathematical operations and the performance of conditionally executed operations. For example, an RF calibration PMRTI could perform the following operations:

IF RF CAL ITEM IS LESS THAN X
EXECUTE INSTRUCTION
ELSE
EXECUTE INSTRUCTION

A PMRTI can support basic mathematical operations, such as: addition, subtraction, multiplication, and division. As with the system software code sections, the PMRTI code section may be loaded in response to UI prompts, and the wireless device must be reset after the PMRTI is loaded into code storage section 112. Then the PMRTI section can be executed. If the PMRTI code section is associated with any virtual tables or read-write data, an updated patch manager code section will be transported with the PMRTI for installation in the code storage section 112. Alternately, the PMRTI can be kept and processed from the FSS 110. After the handset 104 has executed all the instructions in the PMRTI section, the PMRTI section can be deleted from the FSS 110. Alternately, the PMRTI is maintained for future operations. For example, the PMRTI may be executed every time the wireless device is energized.

PMRTI is a very powerful runtime instruction engine. The handset can execute any instruction delivered to it through the PMRTI environment. This mechanism may be used to support RF calibrations. More generally, PMRTI can be used to remote debug wireless device software when software problems are recognized by the manufacturer or service provider, typically as the result of user complaints. PMRTI can also record data needed to diagnose software problems. PMRTI can launch newly downloaded system applications for data analysis, debugging, and fixes. PMRTI can provide RW data based updates for analysis and possible short term fix to a problem in lieu of an updated system software code section. PMRTI can provide memory compaction algorithms for use by the wireless device.

In some aspects of the invention, the organization of the system software into symbol libraries may impact the size of the volatile memory 114 and nonvolatile memory 108 required for execution. This is due to the fact that the code sections are typically larger than the symbol libraries arranged in the code sections. These larger code sections exist to accommodate updated code sections. Organizing the system software as a collection of libraries impacts the nonvolatile memory size requirement. For the same code size, the amount of nonvolatile memory used will be higher due to the fact that code sections can be sized to be larger than the symbol libraries arranged within.

Once software updates have been delivered to the wireless device, the software maintenance system 100 supports memory compaction. Memory compaction is similar to disk de-fragmentation applications in desktop computers. The compaction mechanism ensures that memory is optimally used and is well balanced for future code section updates, where the size of the updated code sections are unpredictable. The system 100 analyzes the code storage section as it is being patched (updated). The system 100 attempts to fit updated code sections into the memory space occupied by the code section being replaced. If the updated code section is larger than the code section being replaced, the system 100 compacts the code sections in memory 112. Alternately, the compaction can be calculated by the manufacturer or service provider, and compaction instructions can be transported to the wireless device 104.

Compaction can be a time consuming process owing to the complexity of the algorithm and also the vast volume of data movement. The compaction algorithm predicts feasibility before it begins any processing. UI prompts can be used to apply for permission from the user before the compaction is attempted.

In some aspects of the invention, all the system software code sections can be updated simultaneously. A complete system software upgrade, however, would require a larger FSS 110.

Figure 3:
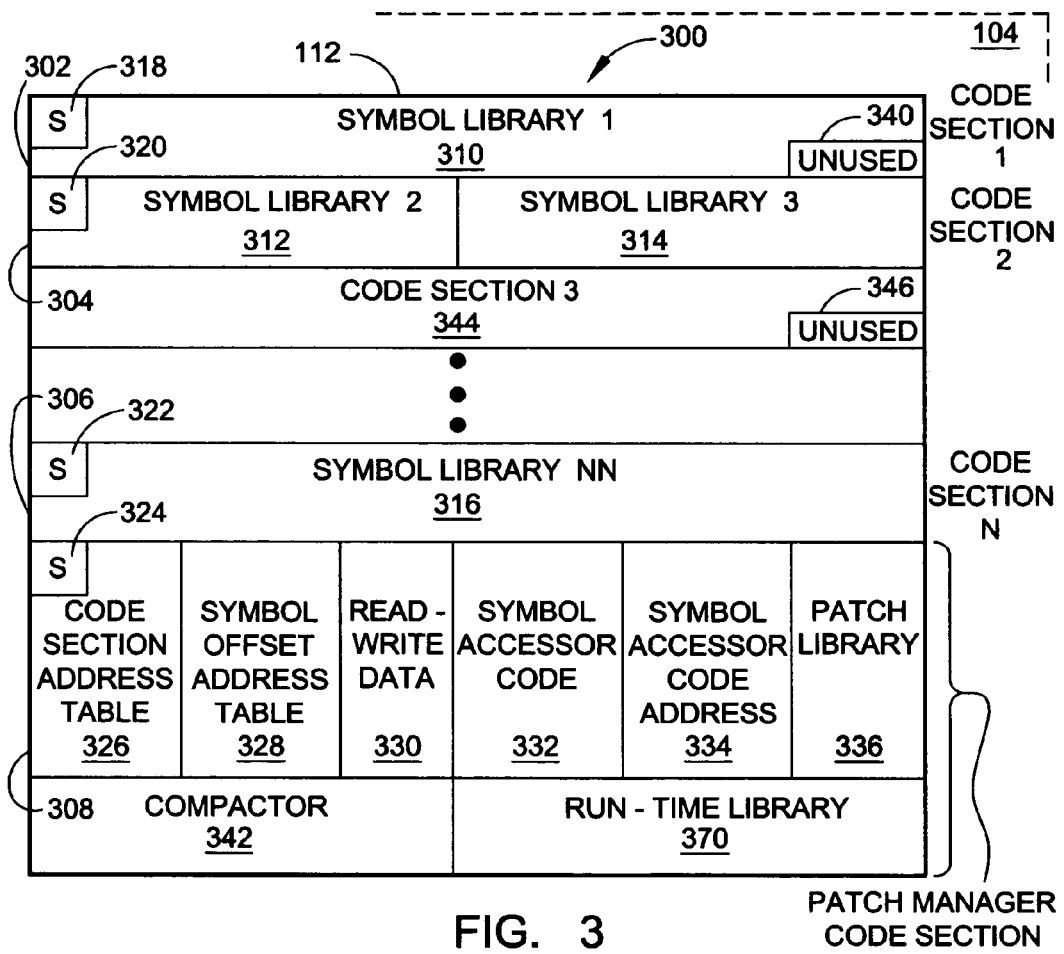
FIG. 3 is a schematic block diagram illustrating the present invention system for executing dynamic instruction sets in a wireless communications device.

FIG. 3 is a schematic block diagram illustrating the present invention dynamic instruction set execution in a wireless communications device. The system 300 comprises a code storage section 112 in memory 108 including executable wireless device system software differentiated into a plurality of current code sections. Code section one (302), code section two (304), code section n (306), and a patch manager code section 308 are shown. However, the invention is not limited to any particular number of code sections. Further, the system 300 further comprises a first plurality of symbol libraries arranged into the second plurality of code sections. Shown are symbol library one (310) arranged in code section one (302), symbol libraries two (312) and three (314) arranged in code section two (304), and symbol library m (316) arranged in code section n (306). Each library comprises symbols having related functionality. For example, symbol library one (310) may be involved in the operation of the wireless device liquid crystal display (LCD). Then, the symbols would be associated with display functions. As explained in detail below, additional symbol libraries are arranged in the patch manger code section 308.

Figure 4:
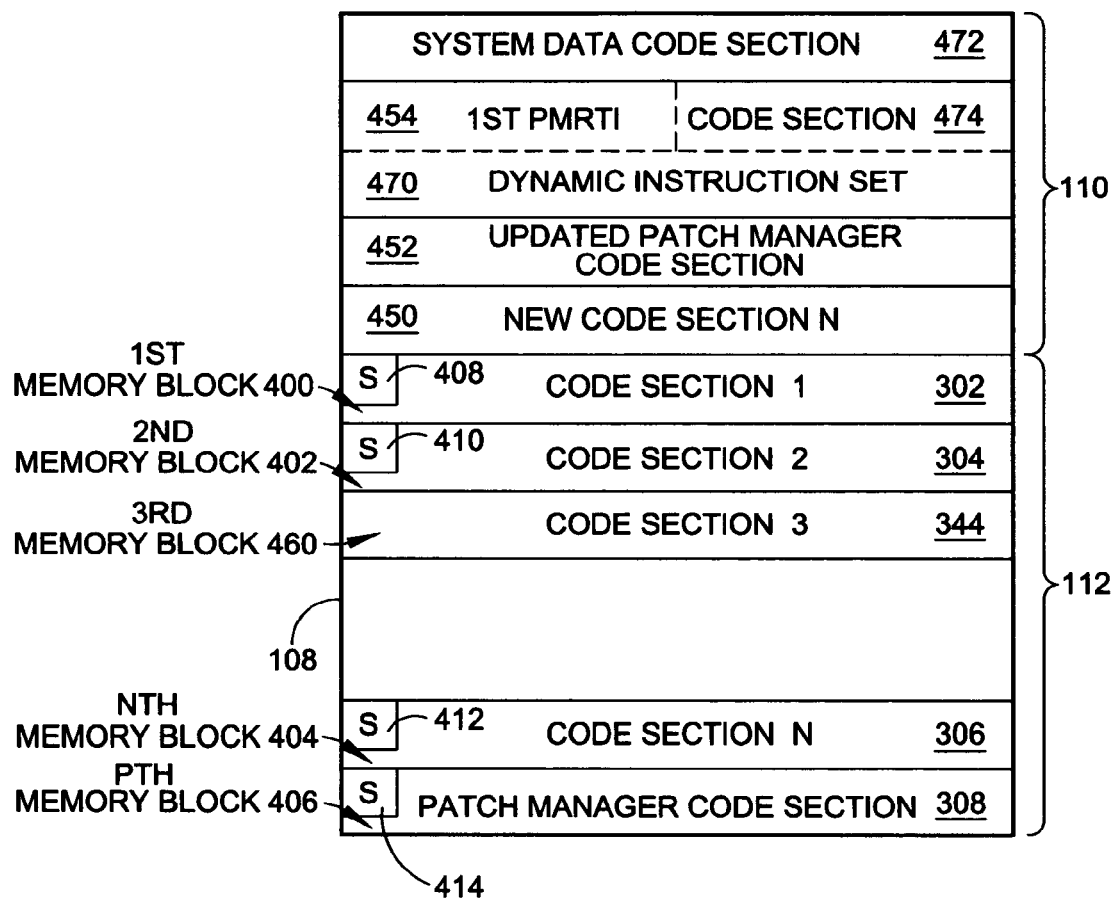
FIG. 4 is a schematic block diagram of the wireless device memory.

FIG. 4 is a schematic block diagram of the wireless device memory. As shown, the memory is the code storage section 112 of FIG. 1. The memory is a writeable, nonvolatile memory, such as Flash memory. It should be understood that the code sections need not necessarily be stored in the same memory as the FSS 110. It should also be understood that the present invention system software structure could be enabled with code sections stored in a plurality of cooperating memories. The code storage section 112 includes a second plurality of contiguously addressed memory blocks, where each memory block stores a corresponding code section from the second plurality of code sections. Thus, code section one (302) is stored in a first memory block 400, code section two (304) in the second memory block 402, code section n (306) in the nth memory block 404, and the patch manager code section (308) in the pth memory block 406.

Contrasting FIGS. 3 and 4, the start of each code section is stored at corresponding start addresses in memory, and symbol libraries are arranged to start at the start of code sections. That is, each symbol library begins at a first address and runs through a range of addresses in sequence from the first address. For example, code section one (302) starts at the first start address 408 (marked with "S") in code storage section memory 112. In FIG. 3, symbol library one (310) starts at the start 318 of the first code section. Likewise code section two (304) starts at a second start address 410 (FIG. 4), and symbol library two starts at the start 320 of code section two (FIG. 3). Code section n (306) starts at a third start address 412 in code storage section memory 112 (FIG. 4), and symbol library m (316) starts at the start of code section n 322 (FIG. 3). The patch manager code section starts at pth start address 414 in code storage section memory 112, and the first symbol library in the patch manager code section 308 starts at the start 324 of the patch manager code section. Thus, symbol library one (310) is ultimately stored in the first memory block 400. If a code section includes a plurality of symbol libraries, such as code section two (304), the plurality of symbol libraries are stored in the corresponding memory block, in this case the second memory block 402.

In FIG. 3, the system 300 further comprises a code section address table 326 as a type of symbol included in a symbol library arranged in the patch manager code section 308. The code section address table cross-references code section identifiers with corresponding code section start addresses in memory.

FIG. 5 is a table representing the code section address table 326 of FIG. 3. The code section address table 326 is consulted to find the code section start address for a symbol library. For example, the system 300 seeks code section one when a symbol in symbol library one is required for execution. To find the start address of code section one, and therefore locate the symbol in symbol library one, the code section address table 326 is consulted. The arrangement of symbol libraries in code sections, and the tracking of code sections with a table permits the code sections to be moved or expanded. The expansion or movement operations may be needed to install upgraded code sections (with upgraded symbol libraries).

Returning to FIG. 3, it should be noted that not every symbol library necessarily starts at the start of a code section. As shown, symbol library three (314) is arranged in code section two (304), but does not start of the code section start address 320. Thus, if a symbol in symbol library three (314) is required for execution, the system 300 consults the code section address table 326 for the start address of code section two (304). As explained below, a symbol offset address table permits the symbols in symbol library three (314) to be located. It does not matter that the symbols are spread across multiple libraries, as long as they are retained with the same code section.

As noted above, each symbol library includes functionally related symbols. A symbol is a programmer-defined name for locating and using a routine body, variable, or data structure. Thus, a symbol can be an address or a value. Symbols can be internal or external. Internal symbols are not visible beyond the scope of the current code section. More specifically, they are not sought by other symbol libraries, in other code sections. External symbols are used and invoked across code sections and are sought by libraries in different code sections. The symbol offset address table typically includes a list of all external symbols.

For example, symbol library one (310) may generate characters on a wireless device display. Symbols in this library would, in turn, generate telephone numbers, names, the time, or other display features. Each feature is generated with routines, referred to herein as a symbol. For example, one symbol in symbol library one (310) generates telephone numbers on the display. This symbol is represented by an "X", and is external. When the wireless device receives a phone call and the caller ID service is activated, the system must execute the "X" symbol to generate the number on the display. Therefore, the system must locate the "X" symbol.

FIG. 6 is a detailed depiction of symbol library one (310) of FIG. 3, with symbols. Symbols are arranged to be offset from respective code section start addresses. In many circumstances, the start of the symbol library is the start of a code section, but this is not true if a code section includes more than one symbol library. Symbol library one (310) starts at the start of code section one (see FIG. 3). As shown in FIG. 6, the "X" symbol is located at an offset of (03) from the start of the symbol library and the "Y" symbol is located at an offset of (15). The symbol offset addresses are stored in a symbol offset address table 328 in the patch manager code section (see FIG. 3).

FIG. 7 is a table representing the symbol offset address table 328 of FIG. 3. The symbol offset address table 328 cross-references symbol identifiers with corresponding offset addresses, and with corresponding code section identifiers in memory. Thus, when the system seeks to execute the "X" symbol in symbol library one, the symbol offset address table 328 is consulted to locate the exact address of the symbol, with respect to the code section in which it is arranged.

Returning to FIG. 3, the first plurality of symbol libraries typically all include read-write data that must be consulted or set in the execution of these symbol libraries. For example, a symbol library may include an operation dependent upon a conditional statement. The read-write data section is consulted to determine the status required to complete the conditional statement. The present invention groups the read-write data from all the symbol libraries into a shared read-write section. In some aspects of the invention, the read-write data 330 is arranged in the patch manager code section 308. Alternately (not shown), the read-write data can be arranged in a different code section, code section n (306), for example.

The first plurality of symbol libraries also includes symbol accessor code arranged in a code section to calculate the address of a sought symbol. The symbol accessor code can be arranged and stored at an address in a separate code section, code section two (304), for example. However, as shown, the symbol accessor code 332 is arranged and stored at an address in the patch manager code section 308. The system 300 further comprises a first location for storage of the symbol accessor code address. The first location can be a code section in the code storage section 112, or in a separate memory section of the wireless device (not shown). The first location can also be arranged in the same code section as the read-write data. As shown, the first location 334 is stored in the patch manager code section 308 with the read-write data 330, the symbol offset address table 328, the code section address table 326, and the symbol accessor code 332, and the patch library (patch symbol library) 336.

The symbol accessor code accesses the code section address table and symbol offset address tables to calculate, or find the address of a sought symbol in memory. That is, the symbol accessor code calculates the address of the sought symbol using a corresponding symbol identifier and a corresponding code section identifier. For example, if the "X" symbol in symbol library one is sought, the symbol accessor is invoked to seek the symbol identifier (symbol ID) "X_1", corresponding to the "X" symbol (see FIG. 7). The symbol accessor code consults the symbol offset address table to determine that the "X_1" symbol identifier has an offset of (03) from the start of code section one (see FIG. 6). The symbol accessor code is invoked to seek the code section identifier "CS_1", corresponding to code section one. The symbol accessor code consults the code section address table to determine the start address associated with code section identifier (code section ID) "CS_1". In this manner, the symbol accessor code determines that the symbol identifier "X_1" is offset (03) from the address of (00100), or is located at address (00103).

The symbol "X" is a reserved name since it is a part of the actual code. In other words, it has an absolute data associated with it. The data may be an address or a value. The symbol identifier is an alias created to track the symbol. The symbol offset address table and the code section address table both work with identifiers to avoid confusion with reserved symbol and code section names. It is also possible that the same symbol name is used across many symbol libraries. The use of identifiers prevents confusion between these symbols.

Returning to FIG. 1, the system 300 further comprises a read-write volatile memory 114, typically random access memory (RAM). The read-write data 330, code section address table 326, the symbol offset address table 328, the symbol accessor code 332, and the symbol accessor code address 334 are loaded into the read-write volatile memory 114 from the patch manager code section for access during execution of the system software. As is well known, the access times for code stored in RAM is significantly less than the access to a nonvolatile memory such as Flash.

Returning to FIG. 3, it can be noted that the symbol libraries need not necessarily fill the code sections into which they are arranged, although the memory blocks are sized to exactly accommodate the corresponding code sections stored within. Alternately stated, each of the second plurality of code sections has a size in bytes that accommodates the arranged symbol libraries, and each of the contiguously addressed memory blocks have a size in bytes that accommodates corresponding code sections. For example, code section one (302) may be a 100 byte section to accommodate a symbol library having a length of 100 bytes. The first memory block would be 100 bytes to match the byte size of code section one. However, the symbol library loaded into code section 1 may be smaller than 100 bytes. As shown in FIG. 3, code section one (302) has an unused section 340, as symbol library one (310) is less than 100 bytes. Thus, each of the second plurality of code sections may have a size larger than the size needed to accommodate the arranged symbol libraries. By "oversizing" the code sections, larger updated symbol libraries can be accommodated.

Contiguously addressed memory blocks refers to partitioning the physical memory space into logical blocks of variable size. Code sections and memory blocks are terms that are essentially interchangeable when the code section is stored in memory. The concept of a code section is used to identify a section of code that is perhaps larger than the symbol library, or the collection of symbol libraries in the code section as it is moved and manipulated.

As seen in FIG. 3, the system 300 includes a patch symbol library, which will be referred to herein as patch library 336, to arrange new code sections in the code storage section with the current code sections. The arrangement of new code sections with current code sections in the code storage section forms updated executable system software. The patch manager 336 not only arranges new code sections in with the current code sections, it also replaces code sections with updated code sections.

Returning to FIG. 4, the file system section 110 of memory 108 receives new code sections, such as new code section 450 and updated patch manager code section 452. The file system section also receives a first patch manager run time instruction (PMRTI) 454 including instructions for arranging the new code sections with the current code sections. As seen in FIG. 1, an airlink interface 150 receives new, or updated code sections, as well as the first PMRTI. Although the airlink interface 150 is being represented by an antenna, it should be understood that the airlink interface would also include an RF transceiver, baseband circuitry, and demodulation circuitry (not shown). The file system section 110 stores the new code sections received via the airlink interface 150. The patch library 336, executing from read-write volatile memory 114, replaces a first code section in the code storage section, code section n (306) for example, with the new, or updated code section 450, in response to the first PMRTI 454. Typically, the patch manager code section 308 is replaced with the updated patch manager code section 452. When code sections are being replaced, the patch library 336 over-writes the first code section, code section n (306) for example, in the code storage section 112 with the updated code sections, code section 450 for example, in the file system section 110. In the extreme case, all the code sections in code storage section 112 are replaced with updated code sections. That is, the FSS 110 receives a second plurality of updated code sections (not shown), and the patch library 336 replaces the second plurality of code sections in the code storage section 112 with the second plurality of updated code sections. Of course, the FSS 110 must be large enough to accommodate the second plurality of updated code sections received via the airlink interface.

As noted above, the updated code sections being received may include read-write data code sections, code section address table code sections, symbol libraries, symbol offset address table code sections, symbol accessor code sections, or a code section with a new patch library. All these code sections, with their associated symbol libraries and symbols, may be stored as distinct and independent code sections. Then each of these code sections would be replaced with a unique updated code section. That is, an updated read-write code section would be received and would replace the read-write code section in the code storage section. An updated code section address table code section would be received and would replace the code section address table code section in the code storage section. An updated symbol offset address table code section would be received and would replace the symbol offset address table code section in the code storage section. An updated symbol accessor code section would be received and would replace the symbol accessor code section in the code storage section. Likewise, an updated patch manager code section (with a patch library) would be received and would replace the patch manager code section in the code storage section.

However, the above-mentioned code sections are typically bundled together in the patch manager code section. Thus, the read-write code section in the code storage section is replaced with the updated read-write code section from the file system section 110 when the patch manager code section 308 is replaced with the updated patch manger code section 450. Likewise, the code section address table, the symbol offset address table, the symbol accessor code sections, as well as the patch library are replaced when the updated patch manager code section 450 is installed. The arrangement of the new read-write data, the new code section address table, the new symbol offset address table, the new symbol accessor code, and the new patch library as the updated patch manager code section 450, together with the current code sections in the code storage section, forms updated executable system software.

When the file system section 110 receives an updated symbol accessor code address, the patch manager replaces the symbol accessor code address in the first location in memory with updated symbol accessor code address. As noted above, the first location in memory 334 is typically in the patch manager code section (see FIG. 3).

As seen in FIG. 3, the patch library 308 is also includes a compactor, or a compactor symbol library 342. The compactor 342 can also be enabled as a distinct and independent code section, however as noted above, it is useful and efficient to bundle the functions associated with system software upgrades into a single patch manager code section. Generally, the compactor 342 can be said to resize code sections, so that new sections can be arranged with current code sections in the code storage section 112.

With the organization, downloading, and compaction aspects of the invention now established, the following discussion will center on the wireless communications device dynamic instruction set execution system 300. The system 300 comprises executable system software and system data differentiated into code sections, as discussed in great detail, above. Further, the system 300 comprises dynamic instruction sets for operating on the system data and the system software, and controlling the execution of the system software. As seen in FIG. 4, a dynamic instruction set 470 is organized into the first PMRTI 454. As seen in FIG. 3, the system also comprises a run-time engine for processing the dynamic instruction sets, enabled as run-time library 370. As with the compactor library 342 and patch library 336 mentioned above, the run-time library 370 is typically located in the patch manager code section 308. However, the run-time library 370 could alternately be located in another code section, for example the first code section 304.

The dynamic instruction sets are a single, or multiple sets of instructions that include conditional operation code, and generally include data items. The run-time engine reads the operation code and determines what operations need to be performed. Operation code can be conditional, mathematical, procedural, or logical. The run-time engine, or run-time library 370 processes the dynamic instruction sets to perform operations such as mathematical or logical operations. That is, the run-time engine reads the dynamic instruction set 470 and performs a sequence of operations in response to the operation code. Although the dynamic instruction sets are not limited to any particular language, the operation code is typically a form of machine code, as the wireless device memory is limited and execution speed is important. The operation code is considered conditional in that it analyzes a data item and makes a decision as a result of the analysis. The run-time engine may also determine that an operation be performed on data before it is analyzed.

For example, the operation code may specify that a data item from a wireless device memory be compared to a predetermined value. If the data item is less than the predetermined value, the data item is left alone, and if the data item is greater than the predetermined value, it is replaced with the predetermined value. Alternately, the operation code may add a second predetermined value to a data item from the wireless device memory, before the above-mentioned comparison operation is performed.

As mentioned above, the file system section nonvolatile memory 110 receives the dynamic instruction sets through an interface such as the airlink 150. As shown in FIG. 1, the interface can also be radio frequency (RF) hardline 160. Then, the PMRTI can be received by the FSS 110 without the system software being operational, such as in a factory calibration environment. The PMRTI can also be received via a logic port interface 162 or an installable memory module 164. The memory module 164 can be installed in the wireless device 104 at initial calibration, installed in the field, or installed during factory recalibration. Although not specially shown, the PMRTI can be received via an infrared or Bluetooth interfaces.

Figure 8A:
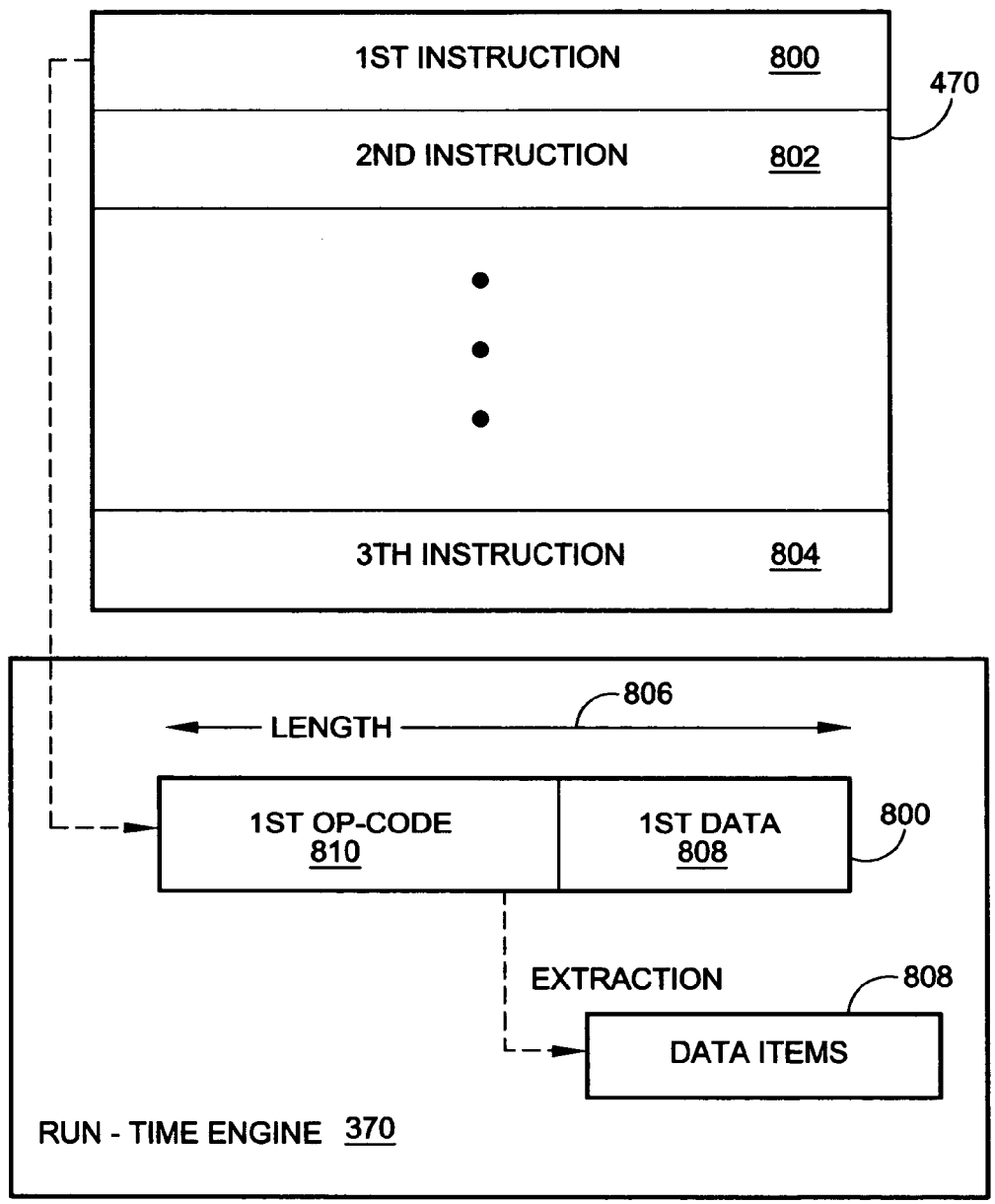
FIGS. 8a and 8b are depictions of the operation code (op-code) being accessed by the run-time engine.
Figure 8B:
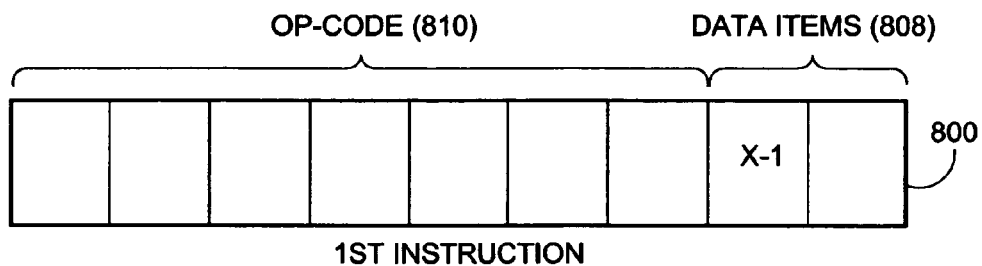

FIGS. 8a and 8b are depictions of instructions being accessed by the run-time engine 370. Shown in FIG. 8a is a first instruction 800, a second instruction 802, and a jth instruction 804, however, the dynamic instruction set is not limited to any particular number of instructions. The length of the operation code in each instruction is fixed. The run-time engine 370 captures the length of the instruction, as a measure of bytes or bits, determine if the instruction includes data items. The remaining length of the instruction, after the operation code is subtracted, includes the data items. The run-time engine extracts the data items from the instruction.

As shown, the length 806 of the first instruction 800 is measured and data items 808 are extracted. Note that not all instructions necessary include data items to be extracted. The run-time engine 370 uses the extracted data 808 in performing the sequence of operations responsive to the operation code 810 in instruction 800.

FIG. 8b is a more detailed depiction of the first instruction 800 of FIG. 8a. Using the first instruction 800 as an example, the instruction includes operation code 810 and data 808. The instruction, and more specifically, the data item section 808 includes symbol identifiers, which act as a link to symbols in the wireless device code sections. As explained in detail above, the symbol identifiers are used with the code section address table 326 (see FIG. 5) and the symbol offset address table 328 (see FIG. 7) to locate the symbol corresponding to the symbol identifier. As shown, a symbol identifier "X_1" is shown in the first instruction 800. The symbol offset address table 328 locates the corresponding symbol in a code section with the "CS_1" identifier and an offset of "3". The code section address table 326 gives the start address of code section one (302). In this manner, the symbol "X" is found (see FIG. 6).

After the run-time engine locates symbols corresponding to the received symbol identifiers using the code section address table and symbol offset address table, it extracts data when the located symbols are data items. For example, if the symbol "X" is a data item in symbol library one (310), the run-time engine extracts it. Alternately, the "X" symbol can be operation code, and the run-time engine executes the symbol "X" when it is located.

PMRTI can be used to update system data, or system data items. In some aspects of the invention system data is stored in a code section in the file system section 110, code section 472 for example, see FIG. 4. The run-time engine accesses system data from code section 472 and analyzes the system data. The run-time engine processes the operation code of the dynamic instruction sets to perform mathematical or logical operation on data items, as described above. After the operation, the run-time engine processes the instructions to create updated system data. Note that the updated system data may include unchanged data items in some circumstances. The system data in the second code section 472 is replaced with the updated system data in response to the operation code. Thus, by the processing of instruction by the run-time engine, the system software is controlled to execute using the updated system data in code section 472. In this manner, specifically targeted symbols in the system software can be updated, without replacing entire code sections. By the same process, the system data can be replaced in a code section in the code storage section 112. For example, the system data can be stored in the third code section 344, and the run-time engine can replace the system data in the third code section with updated system data in response to the operation code.

PMRTI can also be used to update data items in volatile memory 114. As an example, the volatile memory 114 accept read-write data 330, see FIG. 1. The read-write data can be from one, or from a plurality of code sections in the code storage section 112 and/or the FSS 110. The run-time engine accesses the read-write data, analyzes the read-write data 330, creates updated read-write data, and replaces the read-write data 330 in the volatile memory 114 with the updated read-write data in response to the operation code. Then, the system software is controlled to execute using the updated read-write data in volatile memory 114.

In some aspects of the invention, the run-time engine monitors the execution of the system software. Performance monitoring is broadly defined to include a great number of wireless device activities. For example, data such as channel parameters, channel characteristics, system stack, error conditions, or a record of data items in RAM through a sequence of operations leading to a specific failure condition or reduced performance condition can be collected. It is also possible to use dynamic instructions sets to analyze collected performance data, provide updated data variants, and recapture data to study possible solutions to the problem. Temporary fixes can also be provisioned using PMRTI processes.

More specifically, the run-time engine collects performance data, and stores the performance data in the file system section in response to the operation code. Then, the system software is controlled to execute by collecting the performance data for evaluation of the system software. Evaluation can occur as a form of analysis performed by dynamic instruction set operation code, or it can be performed outside the wireless device. In some aspects of the invention, the run-time engine accesses the performance data that has been collected from the file system section and transmits the performance data via an airlink interface in response to the operation code. Collecting performance data from wireless devices in the field permits a manufacturer to thoroughly analyze problems, either locally or globally, without recalling the devices.

In some aspects of the invention, file system section 110 receives a patch manager run time instruction including a new code section. For example, a new code section 474 is shown in FIG. 4. Alternately, the new code section can be independent of the PMRTI, such as new code section n (450). For example, the new code section n (450) may have been received in earlier airlink communications, or have been installed during factory calibration. The run-time engine adds the new code section 474 (450) to the code storage section in response to the operation code. In some aspects of the invention, the new code section is added to an unused block in the code storage section 112. Alternately, a compaction operation is required. Then, the system software is controlled to execute using the new code section 474 (450). In other aspects of the invention, the PMRTI 454 includes an updated code section 474. Alternately, the new code section 450 is an updated code section independent of the PMRTI. The run-time engine replaces a code section in the code storage section, code section two (304) for an example, with the updated code section 474 (450) in response to the operation code. The system software is controlled to execute using the updated code section 474 (450). In some aspects of the invention a compaction operation is required to accommodate the updated code section. Alternately, the updated code section is added to an unused or vacant section of the code storage section.

As explained above, the addition of a new code section or the updating of a code section typically requires the generation of a new code section address table, as these operation involve either new and/or changed code section start addresses. Further, a compaction operation also requires a new code section address table. The compaction operations may be a result of the operation of the compactor 342, explained above, or the result of PMRTI instructions that supply details as to how the compaction is to occur. When the PMRTI includes downloading and compaction instructions, the PMRTI typically also includes a new code section address table that becomes valid after the downloading and compaction operations have been completed.

Figure 9:
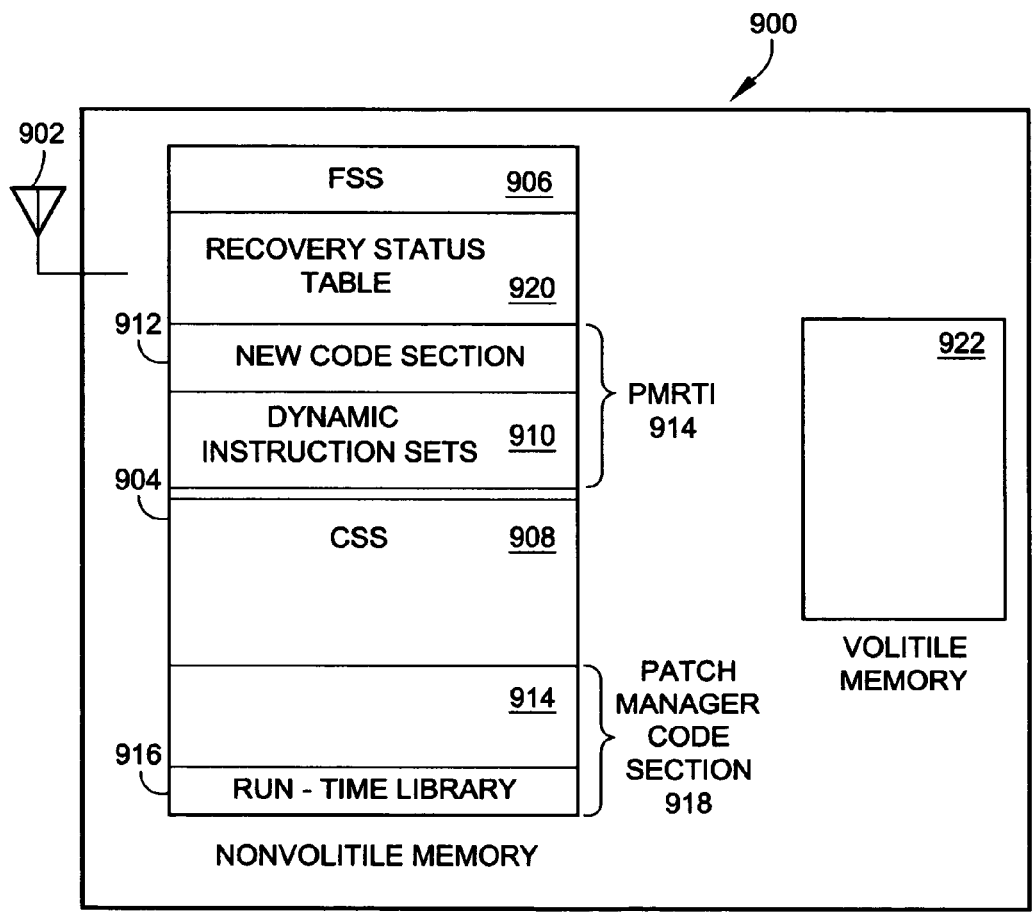
FIG. 9 is a schematic block diagram including features of FIGS. 1-8b presented for the purpose of illustrating the present invention system for managing system software download operations in a wireless communications device.

FIG. 9 is a schematic block diagram including features of FIGS. 1-8b presented for the purpose of illustrating the present invention system for managing system software download operations in a wireless communications device.

The system 900 comprises an airlink interface 902, equivalent the airlink interface 150 of FIG. 1, and executable system software and system data differentiated into code sections stored in nonvolatile memory permanent storage 904, equivalent to memory 108 of FIG. 1. The nonvolatile permanent storage 904 includes a file system section 906 and code storage section 908.

Dynamic instruction sets 910 for managing the downloading of system software updates are received via the airlink interface 902. The dynamic instruction sets 910, as well as new code sections 912, are part of patch manager run time instructions 914. Typically, the dynamic instruction sets 910 are stored in the file system section 906. A run-time engine, or run-time library 916 processes the dynamic instruction sets 910. As mentioned above, the run-time library 916 is typically part of the patch manager code section 918. The executable system software and system data (code sections in permanent memory 904) are updated in response to processing the dynamic instruction sets 910. The dynamic instruction sets 910 include functional managers selected from the group including recovery status monitoring, back up, compacting, and update ordering.

The system 900 further comprises a recovery status table 920 cross-referencing new code section identifiers with their update status. The recovery status table 920 is shown as a separate code section in the file system section 906. In some aspects of the invention the recovery status table 920 is loaded into volatile memory 922 when the system 900 is turned on. The table 920 is updated in volatile memory 922 and restored in permanent memory 904 when the system is turned off.

Figure 10:
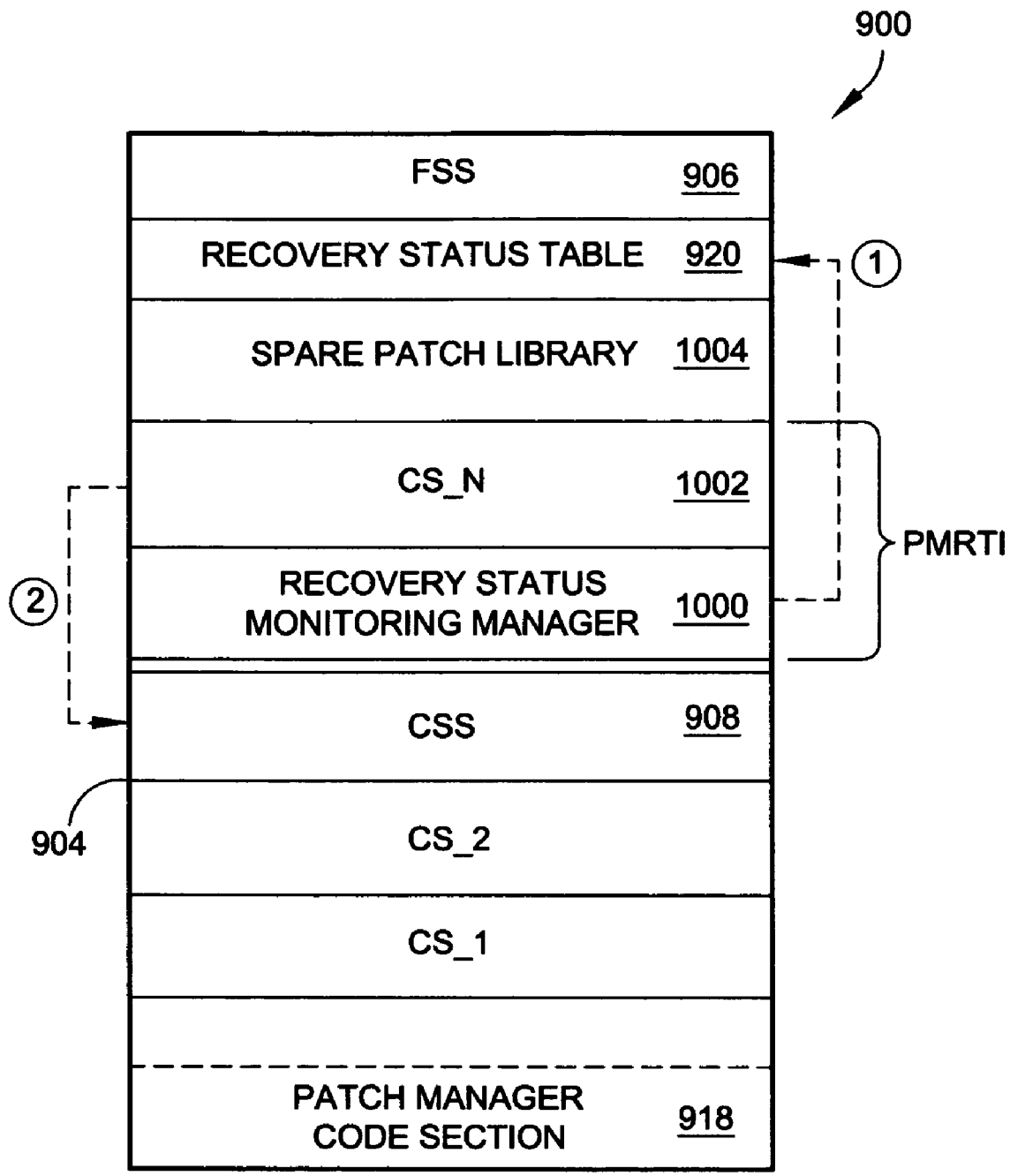
FIG. 10 is the schematic block diagram of the system of FIG. 9 featuring the dynamic instruction set recovery status monitoring manager aspect of the dynamic instruction sets.

FIG. 10 is the schematic block diagram of the system 900 of FIG. 9 featuring the dynamic instruction set recovery status monitoring manager 1000 aspect of the dynamic instruction sets. The dynamic instruction set recovery status monitoring manager, hereafter referred to as the recovery status monitoring manager 1000, reads the recovery status table 920 (see dotted arrow "1") in response to rebooting the wireless communications device, to determine if new code sections have been stored in permanent storage.

Figure 11:
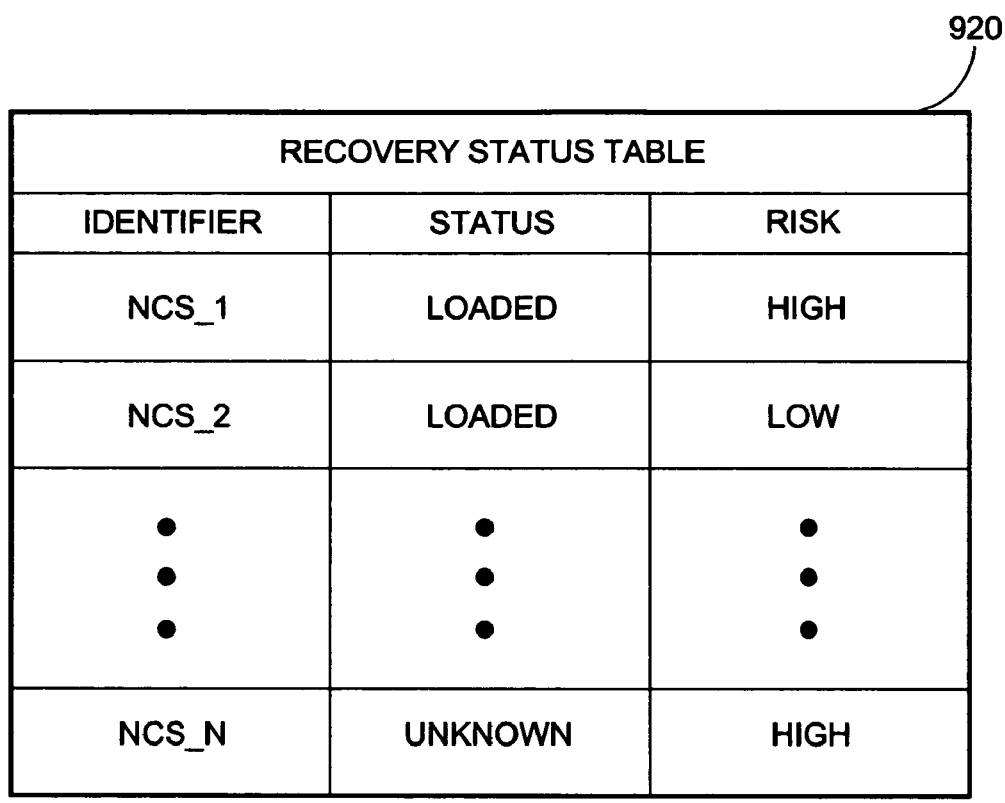
FIG. 11 is a representation depicting an exemplary recovery status table of FIG. 9.

FIG. 11 is a representation depicting an exemplary recovery status table 920 of FIG. 9. The table 920 shows that the code sections identified as CS_1 and CS_2 have been successfully moved from the file system section 906 to the code storage section 908. However, the table indicates that it is unknown whether the code section identified as CS_n has been successfully stored. For example, the user may have turned off the wireless device before the storage operation was completed, or the wireless device battery died.

Returning to FIG. 10, recovery status monitoring manager 1000 stores the new code section in permanent storage if the new code sections have not been stored and updates the recovery status table when the new code sections have been stored. For example, the recovery status monitoring manager 1000 stores CS_n (1002) in code storage section 908 (see dotted arrow "2"), and then updates the recovery status table so that the CS_n status is changed to "loaded" (not shown). Note, that the patch manger functions mentioned above are typically used in the moving of code sections from the file system section 906 to the code storage section 908.

In some aspects of the invention, the recovery status monitoring manager 1000 further determines the risk associated with storing each new code section and, if the risk of storing new code sections is high, takes safety precautions. For example, the recovery status monitoring manager 1000 takes safety precautions such as checking the battery for sufficient power to complete the new code storing process, warning the user of high-risk code storing operations, using prompts to verify user-initiated power downs, and preventing user-initiated power downs. Returning briefly to FIG. 11, the risk factor is represented as a column in the recovery status table.

The storage of some code sections involves the replacement of key code section in the system software with updated code sections. For example, the file system section 906 may receive new code sections such as a boot code section, a patch manager code section, a code section address table, a symbol offset address table, read-write data, and symbol accessor code addresses (not shown). The incomplete storage of any of these code sections may result the wireless device being completely non-operational upon turn-on. That is, the wireless device would likely have to be returned for reprogramming at a service center. Therefore, the recovery status monitoring manager 1000 determines the risk associated with storing each of these new code sections in the file system section, and takes safety precautions accordingly.

The file system section can potentially receive patch manager run time instructions including a new patch manager code section, CS_n (1002) for example. As described above, the patch manger code section includes a patch library for moving code sections in the file system section 906 into permanent storage, typically the code storage section 908. In some aspects of the invention, the recovery status monitoring manager 1000 maintains a spare patch library 1004 in the file system section 906. The recovery status monitoring manager 1000 reads the recovery status table 920 to determine if the new patch manager code section has been successfully stored in the code storage section in response to rebooting the wireless communications device. If the new patch manager code section 1002 has not been successfully stored in the code storage section, the spare patch library 1004 is used to move the new patch manager code section 1002 from the file system section 906 to code storage section 908. Then, the new patch manager code section 1002 can be used for system software operations. Without the spare patch library 1004, the wireless device would be unable to recover from the incomplete storage of a new patch manager code section.

Figure 12:
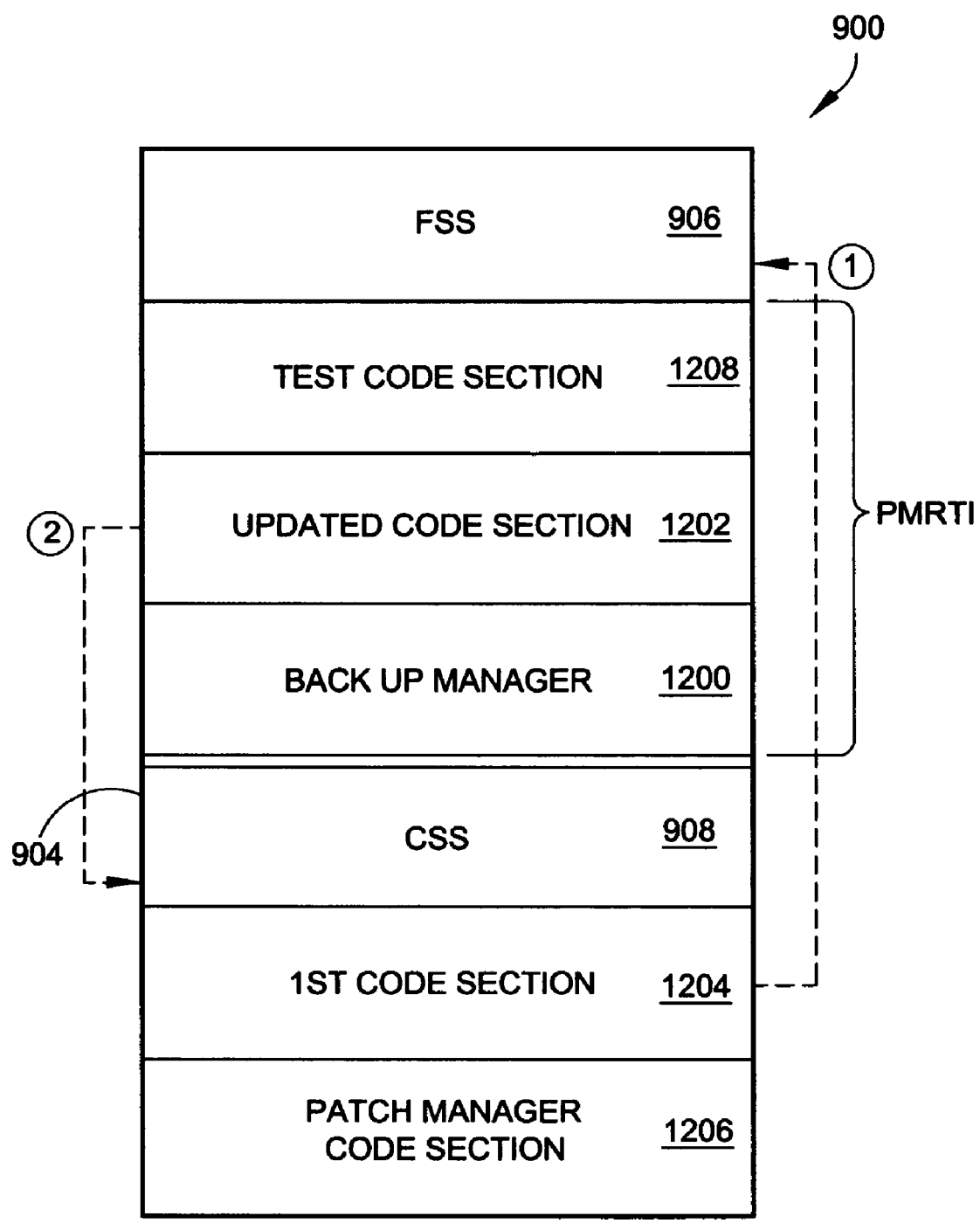
FIG. 12 is the schematic block diagram of the system of FIG. 9 featuring the dynamic instruction set back up manager aspect of the dynamic instruction sets.

FIG. 12 is the schematic block diagram of the system 900 of FIG. 9 featuring the dynamic instruction set back up manager 1200 aspect of the dynamic instruction sets. The dynamic instruction set back up manger is hereafter referred to as the back up manger 1200. As the title suggests, the back up manger provides a system for recovering code sections or system data that has been replaced with code sections that are non-operational with the system software. For example, the file system section 906 receives an updated first code section 1202 to replace a first code section 1204 in the code storage section 908. The back up manager 1200 moves the first code section 1204 from the code storage section 908 to the file system section 906 (see dotted line "1"), typically using libraries from the patch manger code section 1206. Using libraries from the patch manager code section 1206, the updated code section 1202 is moved from the file system section 906 to the code storage section 908 (see dotted line "2"). The back up manager 1200 determines if the updated first code section 1202 in the code storage section 908 operates with the system software within predetermined constraints. The back up manager 1200 replaces the updated first code section 1202 in the code storage section 908 with the first code section 1204 from the file system section 906, if the updated first code section 1202 is determined to not operate with the system software within the predetermined constraints.

In some aspects of the invention, the file system section 906 receives a test code section 1208 with predetermined constraints. The back up manager 1200 determines if the updated first code section 1202 in the code storage section 908 operates with the system software within predetermined constraints by executing the test code section with the updated code section. The back up manager records the results of executing the test code section 1208, and compares the recorded results with the predetermined constraints. In other aspects of the invention the file system section 906 receives an updated code section 1202 with a test code library. Then, the back up manager 1200 executes the test code library from the updated code section. That is, a separate test code section is not required as part of the patch manager run time instruction.

The file system section 906 can receive the test code section from a variety of sources such as an airlink interface (902, see FIG. 9), a user operated keyboard interface (not shown), a test port interface such as a logic port, serial port, or RF port, and even a memory module.

Figure 13:
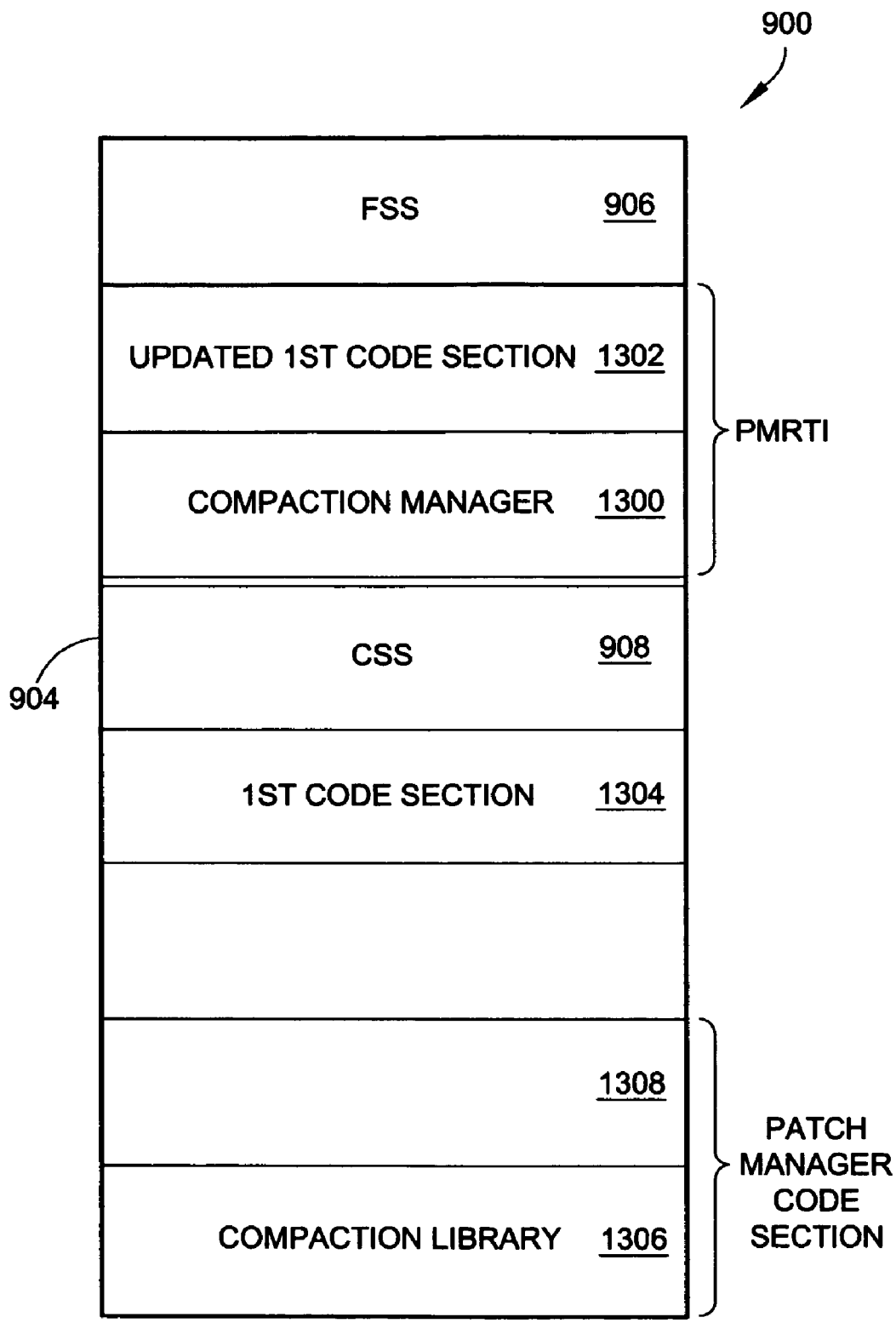
FIG. 13 is the schematic block diagram of the system of FIG. 9 featuring the dynamic instruction compaction manager aspect of the dynamic instruction sets.

FIG. 13 is the schematic block diagram of the system 900 of FIG. 9 featuring the dynamic instruction compaction manager 1300 aspect of the dynamic instruction sets. As explained above, the compaction manager is responsible for manipulating code sections in the code storage section to fit new code sections, or to accommodate updated code sections that are larger than the code sections to be replaced. For example, the file system section 906 receives an updated first code section 1302, having an updated code section size, to replace a first code section 1304 having a first size smaller than the updated first code section size. The compaction manager 1300 accesses a compaction library 1306 in a patch manager code section 1308 and resizes code sections in the code storage section 908 to accommodate the updated first code section 1302.

As with the recovery status monitoring manager, the compaction manager 1300 determines the risk associated with compacting code sections in the code storage section and, if the risk of compacting code sections is high, takes safety precautions. For example, compacting the patch manger code section, or other critical parts of the system software is risky, as the wireless device may not be able to recover from an improper or uncompleted compaction operation. The compaction manager 1300 takes safety precautions such as checking the battery for sufficient power to complete the new code storing process, warning the user of high-risk code storing operations, using prompts to verify user-initiated power downs, and preventing user-initiated power downs.

Figure 14:
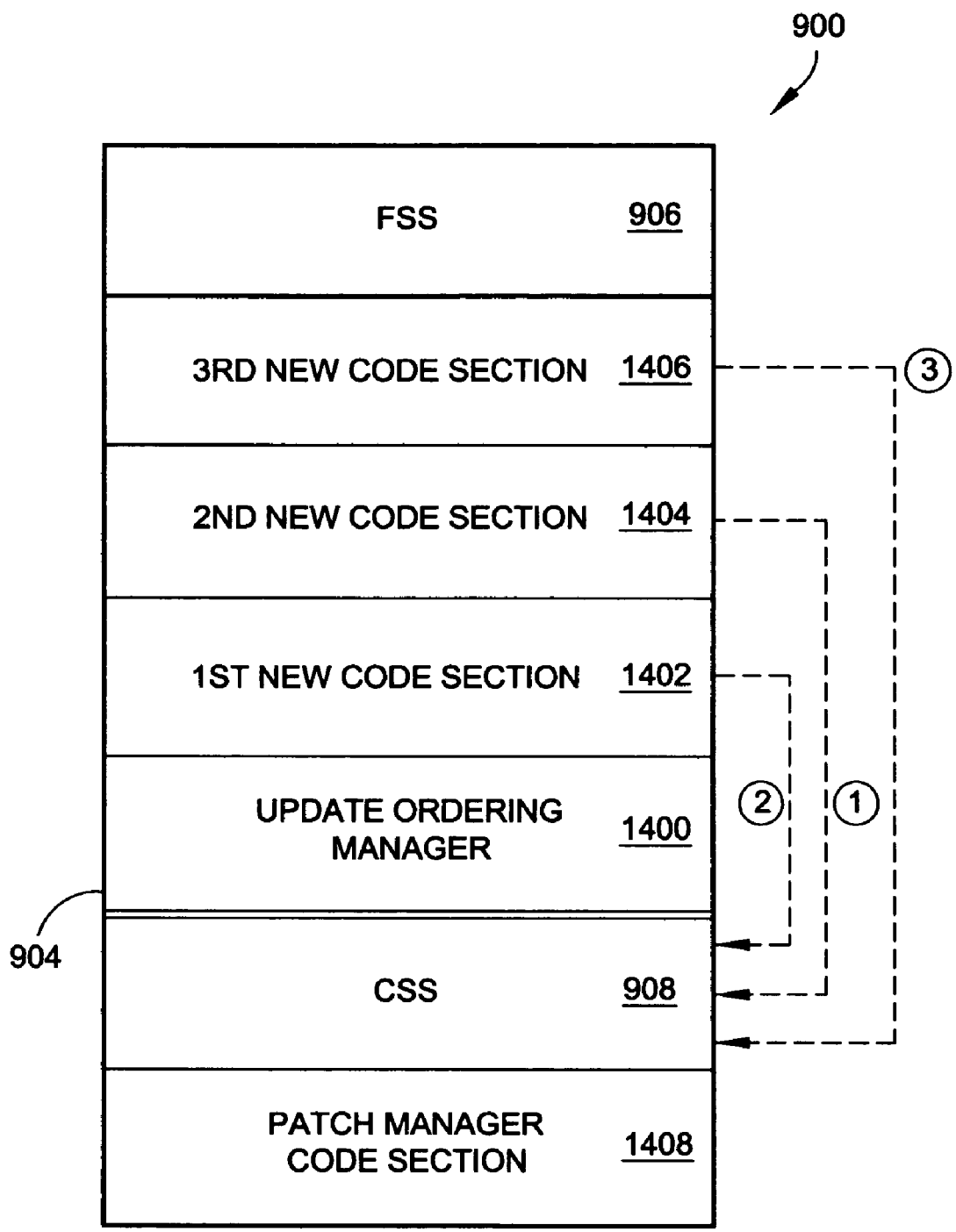
FIG. 14 is the schematic block diagram of the system of FIG. 9 featuring the dynamic instruction set update ordering manager aspect of the dynamic instruction sets.

FIG. 14 is the schematic block diagram of the system 900 of FIG. 9 featuring the dynamic instruction set update ordering manager 1400 aspect of the dynamic instruction sets. When multiple new or updated code sections are to be stored, the update ordering manger 1400 determines the order of storage. For example, the file system section 906 receives the update ordering dynamic instruction sets or update ordering manager 1400 with a plurality of new code sections, such as first new code section 1402, second new code section 1404, and third new code section 1406. The update ordering manager 1400 moves the new code sections 1402-1406 from the file system storage 906 to the code storage section 908 in an order dictated by the ordering instruction 1400.

As shown, the second new code section 1404 is moved first (dotted line "1"), the first new code section 1402 is moved second (dotted line "2"), and the third new code section 1406 is moved third (dotted line "3"). The move and store operations are accomplished with the help of libraries form the patch manger code section 1408. In some aspects of the invention, the ordering manager 1400 determines the risk associated with storing each new code section 1402-1406 and orders the high risk code sections to be moved after lower risk storage sections. In this example, the update ordering manager 1400 has determined that the third new code section 1406 is the most risky to store.

Figure 15A:
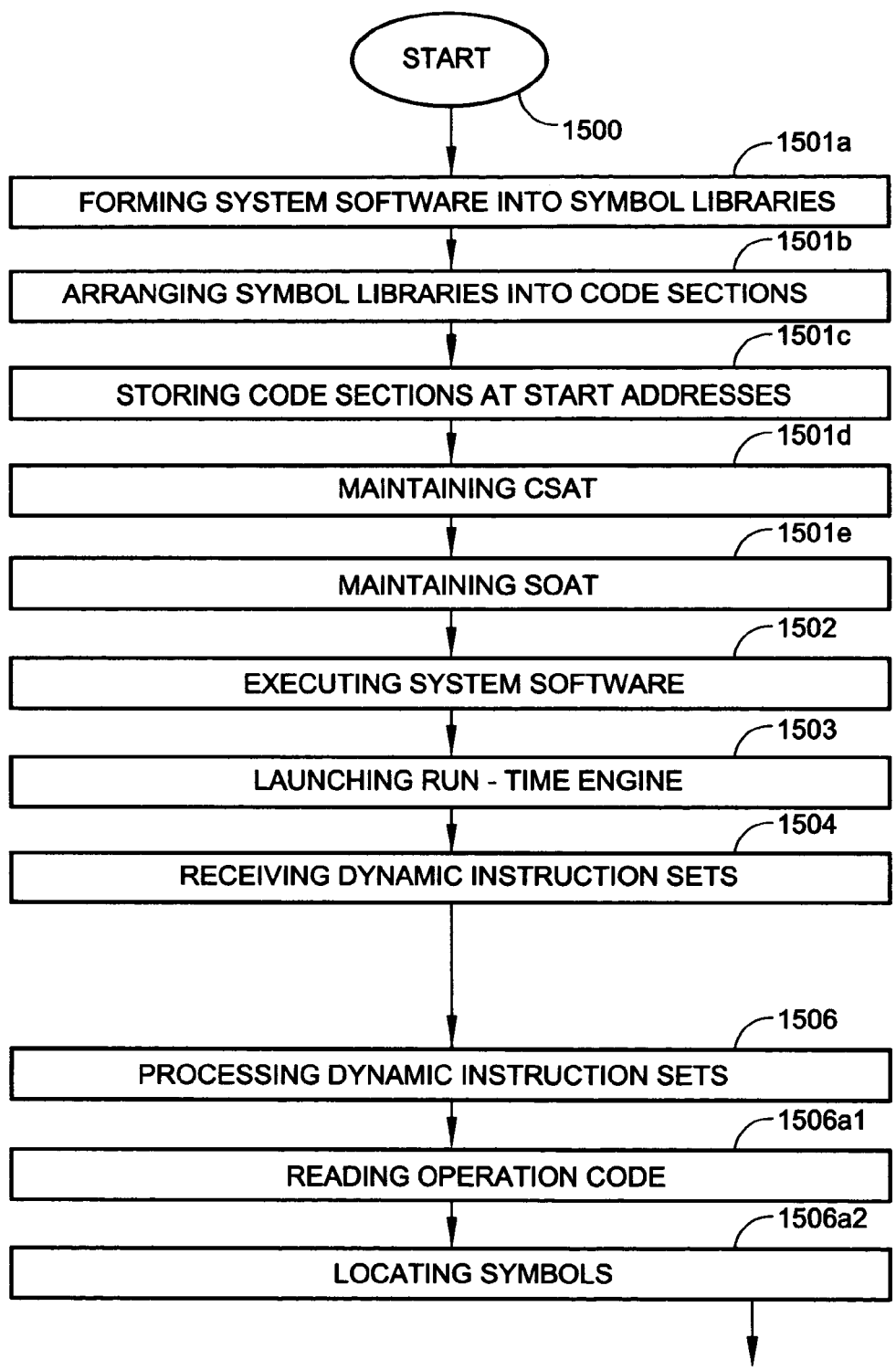
FIGS. 15a and 15b are flowcharts illustrating the present invention method for executing dynamic instruction sets in a wireless communications device.
Figure 15B:
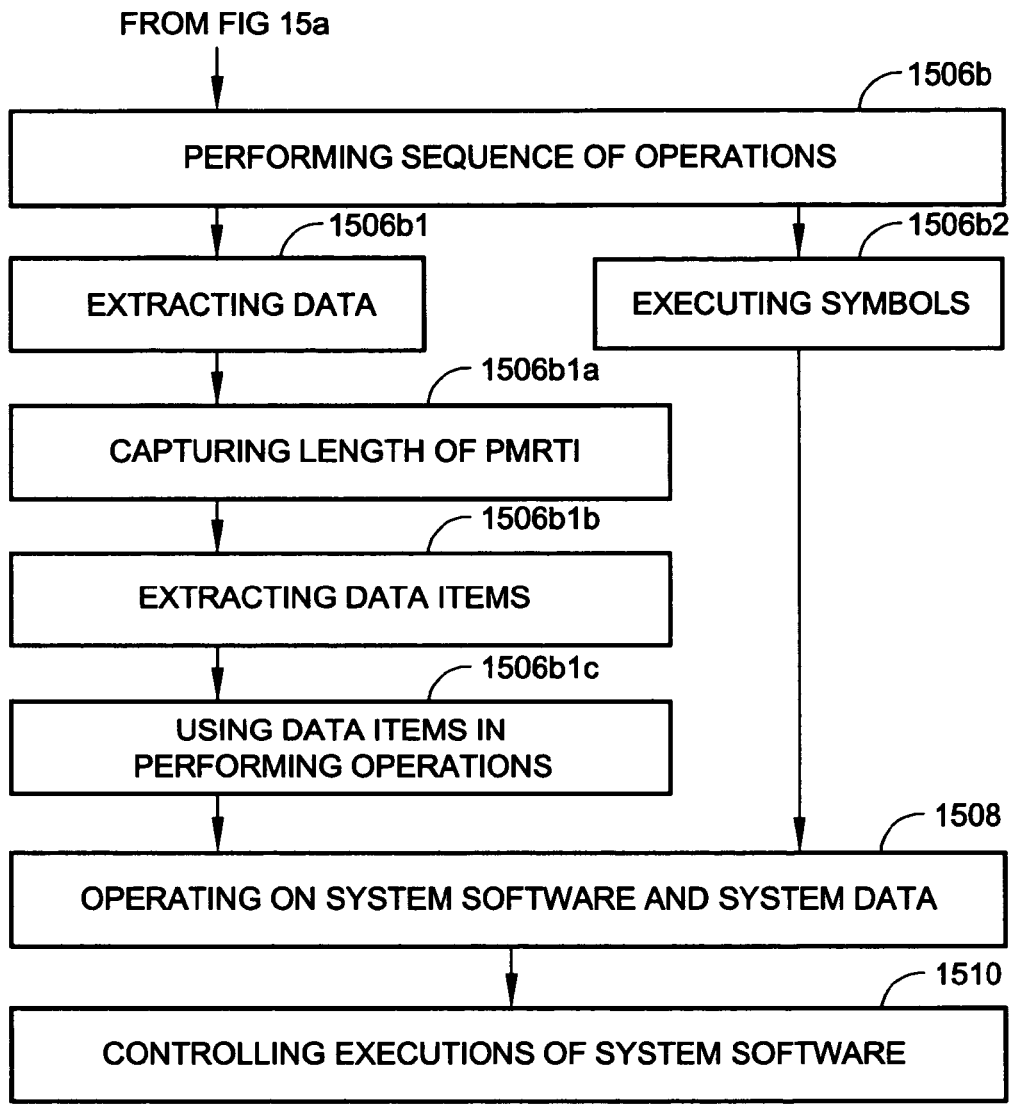

FIGS. 15a and 15b are flowcharts illustrating the present invention method for executing dynamic instruction sets in a wireless communications device. Although depicted as a sequence of numbered steps for clarity, no order should be inferred from the numbering (and the numbering in the methods presented below) unless explicitly stated. The method starts at Step 1500. Step 1501a forms the system software into symbol libraries, each symbol library comprising symbols having related functionality. Step 1501b arranges the symbol libraries into code sections. Step 1502 executes system software. Step 1503 launches a run-time engine. Typically, launching a run-time engine includes invoking a run-time library from a first code section. The run-time engine can be launched from either volatile or nonvolatile memory. Step 1504, following Step 1503, receives the dynamic instruction sets. Receiving the dynamic instruction sets in Step 1504 includes receiving the dynamic instruction sets through an interface selected from the group including airlink, radio frequency (RF) hardline, installable memory module, infrared, and logic port interfaces. In some aspects of the invention, receiving the dynamic instruction set in Step 1504 includes receiving a patch manager run time instruction (PM-RTI) in a file system section nonvolatile memory.

Step 1506 processes dynamic instruction sets. Processing dynamic instruction sets includes processing instructions in response to mathematical and logical operations. In some aspects of the invention, Step 1507 (not shown), following the processing of the dynamic instruction sets, deletes dynamic instruction sets. Step 1508 operates on system data and system software. Step 1510, in response to operating on the system data and system software, controls the execution of the system software.

Typically, receiving the patch manager run time instructions in Step 1504 includes receiving conditional operation code and data items. Then, processing dynamic instruction sets in Step 1506 includes substeps. Step 1506a1 uses the run-time engine to read the patch manager run time instruction operation code. Step 1506b performs a sequence of operations in response to the operation code.

In some aspects, arranging the symbol libraries into code sections in Step 1501b includes starting symbol libraries at the start of code sections and arranging symbols to be offset from their respective code section start addresses. Then the method comprises further steps. Step 1501c stores the start of code sections at corresponding start addresses. Step 1501d maintains a code section address table (CSAT) cross-referencing code section identifiers with corresponding start addresses. Step 1501e maintains a symbol offset address table (SOAT) cross-referencing symbol identifiers with corresponding offset addresses, and corresponding code section identifiers.

In some aspects of the invention, receiving the patch manager run time instruction in Step 1504 includes receiving symbol identifiers. Then, the method comprises a further step. Step 1506a2 locates symbols corresponding to the received symbol identifiers by using the code section address table and symbol offset address table. Performing a sequence of operations in response to the operation code in Step 1506b includes substeps. Step 1506b1 extracts the data when the located symbols are data items. Step 1506b2 executes the symbols when the located symbols are instructions.

In some aspects of the invention, processing dynamic instruction sets in Step 1506b1 includes additional substeps. Step 1506b1a uses the run-time engine to capture the length of the patch manager run time instruction. Step 1506b1b extracts the data items from the patch manager run time instruction, in response to the operation code. Step 1506b1c uses the extracted data in performing the sequence of operations responsive to the operation code.

Figure 16:
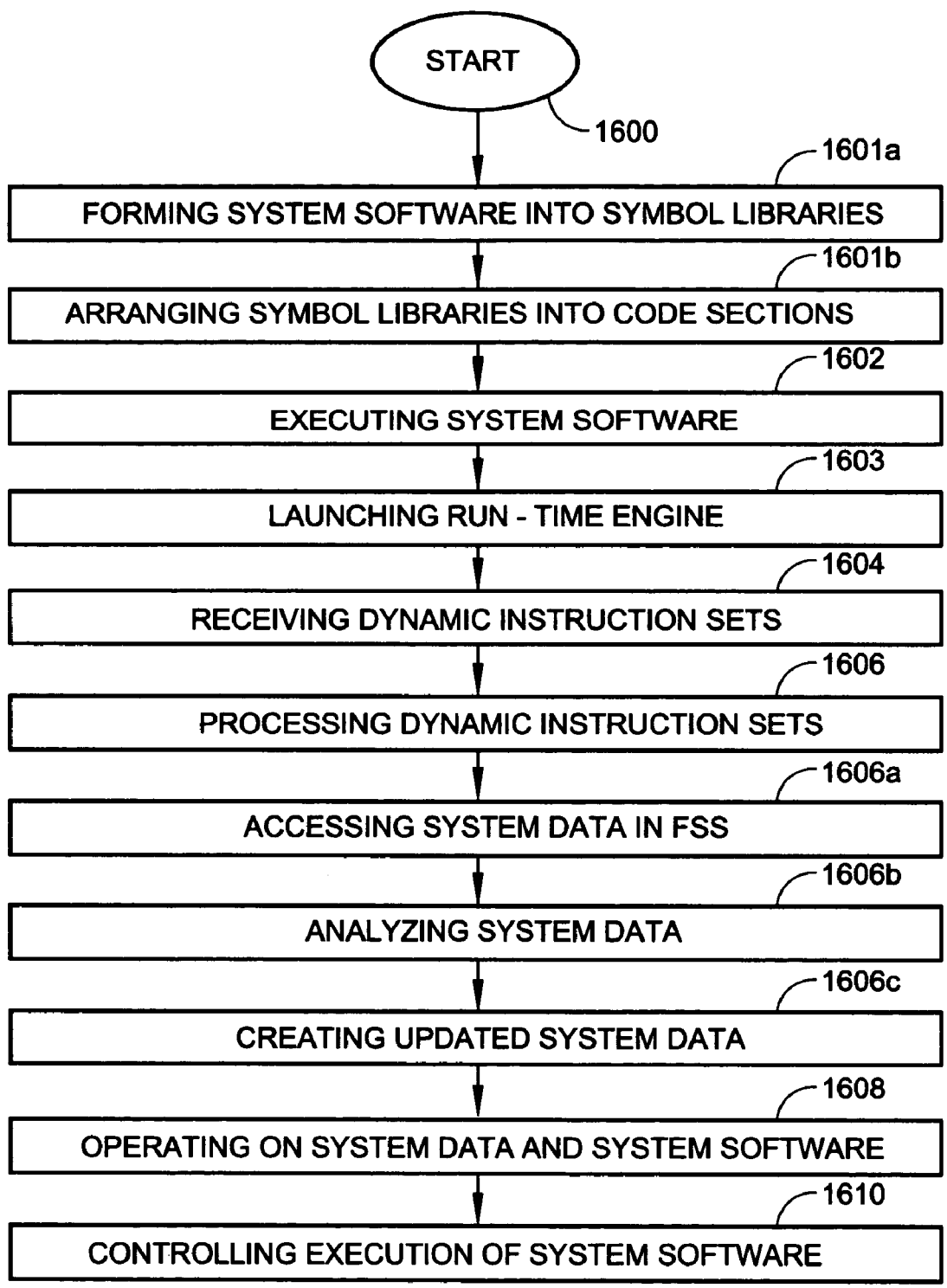
FIG. 16 is a flowchart illustrating an exemplary dynamic instruction set operation.

FIG. 16 is a flowchart illustrating an exemplary dynamic instruction set operation. Several of the Steps in FIG. 16 are the same as in FIG. 15, and are not repeated here in the interest of brevity. Processing dynamic instruction sets in Step 1606 includes substeps. Step 1606a accesses system data stored in a second code section in the file system section. Step 1606b analyzes the system data. Step 1606c creates updated system data. Then, operating on system data and system software in Step 1608 includes replacing the system data in the second section with the updated system data, and controlling the execution of the system software in Step 1610 includes using the updated system data in the execution of the system software.

Figure 17:
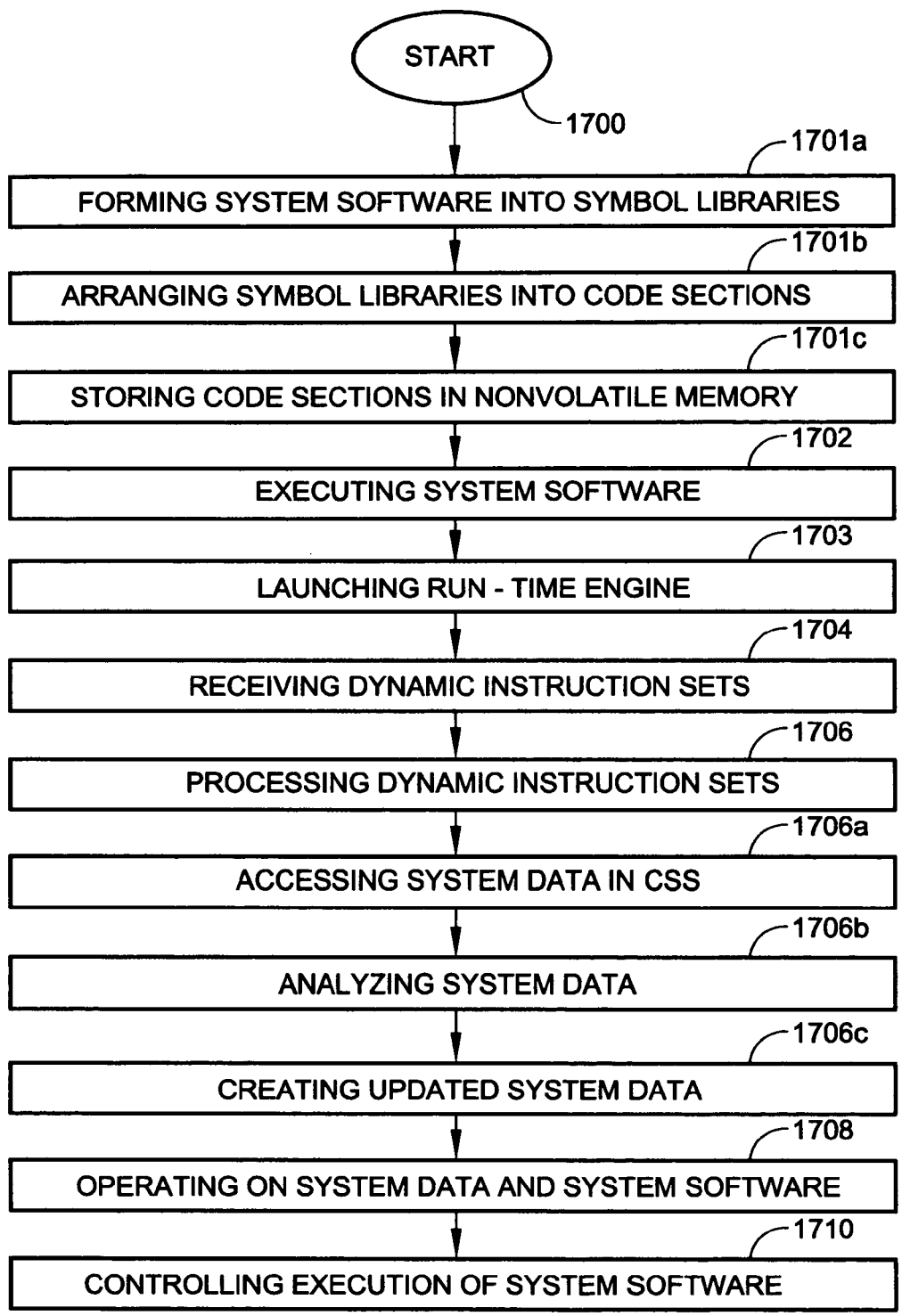
FIG. 17 is a flowchart illustrating another exemplary dynamic instruction set operation.

FIG. 17 is a flowchart illustrating another exemplary dynamic instruction set operation. Several of the Steps in FIG. 17 are the same as in FIG. 15, and are not repeated here in the interest of brevity. Step 1701c stores a plurality of code sections in a code storage section nonvolatile memory. Processing dynamic instruction sets in Step 1706 includes substeps. Step 1706a accesses system data stored in a third code section in the code storage section (CSS). Step 1706b analyzes the system data. Step 1706c creates updated system data. Operating on the system data and system software in Step 1708 includes replacing the system data in the third code section with the updated system data. Controlling the execution of the system software in Step 1710 includes using the updated system data in the execution of the system software.

Figure 18:
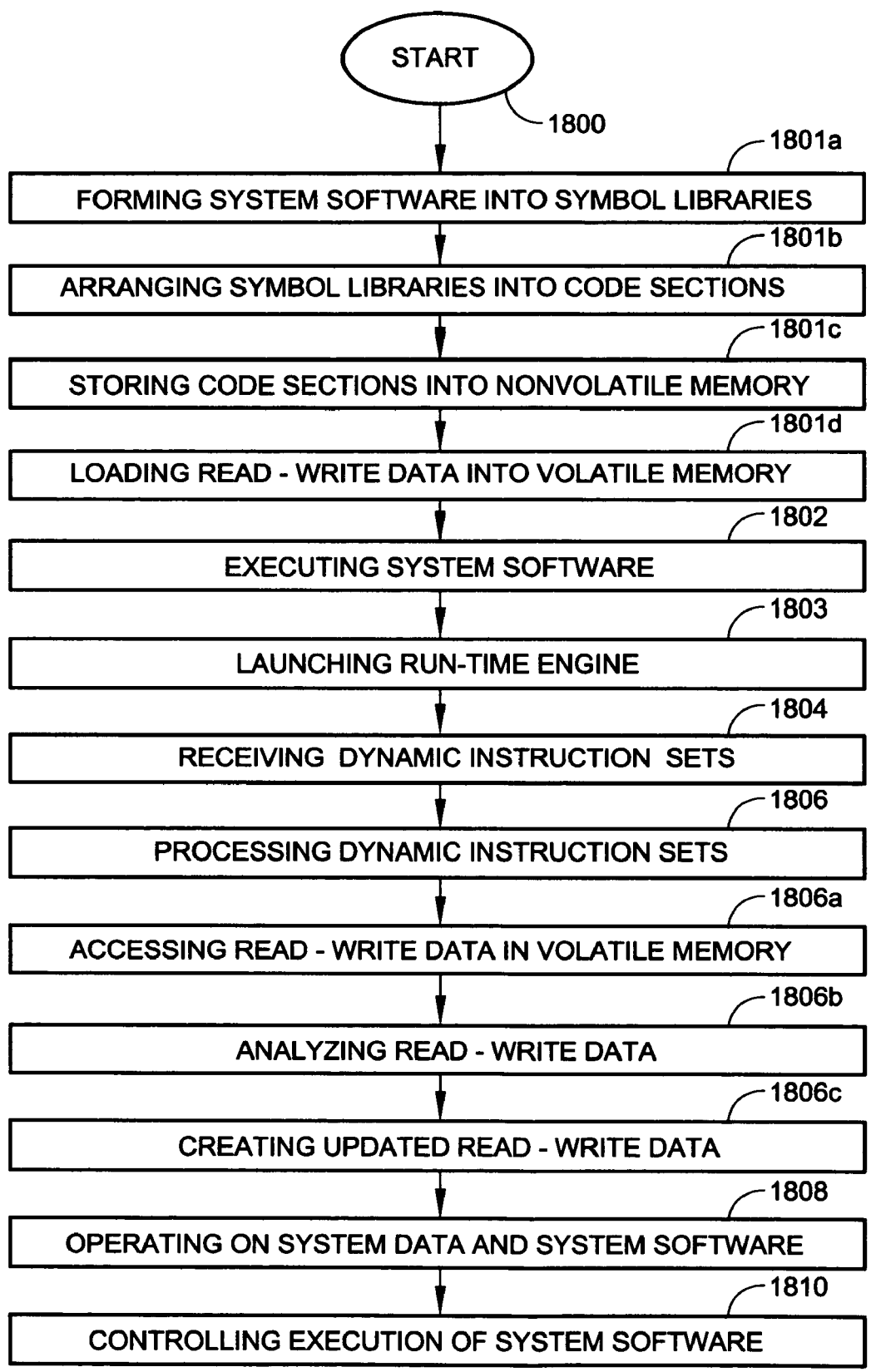
FIG. 18 is a flowchart illustrating a third exemplary dynamic instruction set operation.

FIG. 18 is a flowchart illustrating a third exemplary dynamic instruction set operation. Several of the Steps in FIG. 18 are the same as in FIG. 15, and are not repeated here in the interest of brevity. Step 1801c stores a plurality of code sections in a code storage section nonvolatile memory. Step 1801d loads read-write data into volatile memory. Processing dynamic instruction sets in Step 1806 includes substeps. Step 1806a accesses the read-write data in volatile memory. Step 1806b analyzes the read-write data. Step 1806c creates updated read-write data. Operating on the system data and system software in Step 1808 includes replacing the read-write data in volatile memory with the updated read-write data. Controlling the execution of the system software in Step 1810 includes using the updated read-write data in the execution of the system software.

Figure 19:
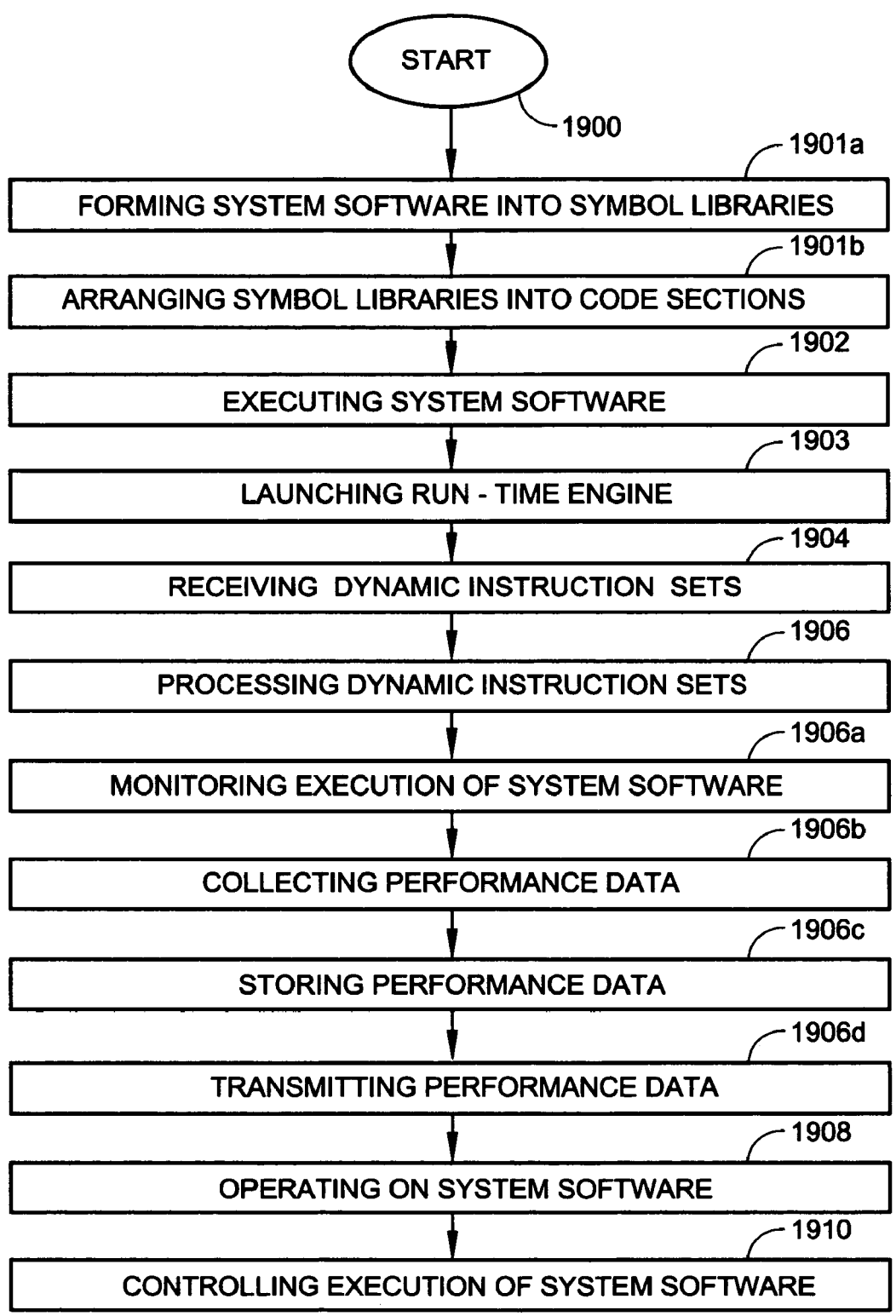
FIG. 19 is a flowchart illustrating a fourth exemplary dynamic instruction set operation.

FIG. 19 is a flowchart illustrating a fourth exemplary dynamic instruction set operation. Several of the Steps in FIG. 19 are the same as in FIG. 15, and are not repeated here in the interest of brevity. Processing dynamic instruction sets includes substeps. Step 1906a, in response to the operation code, monitors the execution of the system software. Step 1906b collects performance data. Step 1906c stores the performance data. Step 1906d transmits the stored data via an airlink interface. Operating on the system data and system software in Step 1908 includes using the performance data in the evaluation of system software. Step 1910 controls the execution of the system software.

Figure 20:
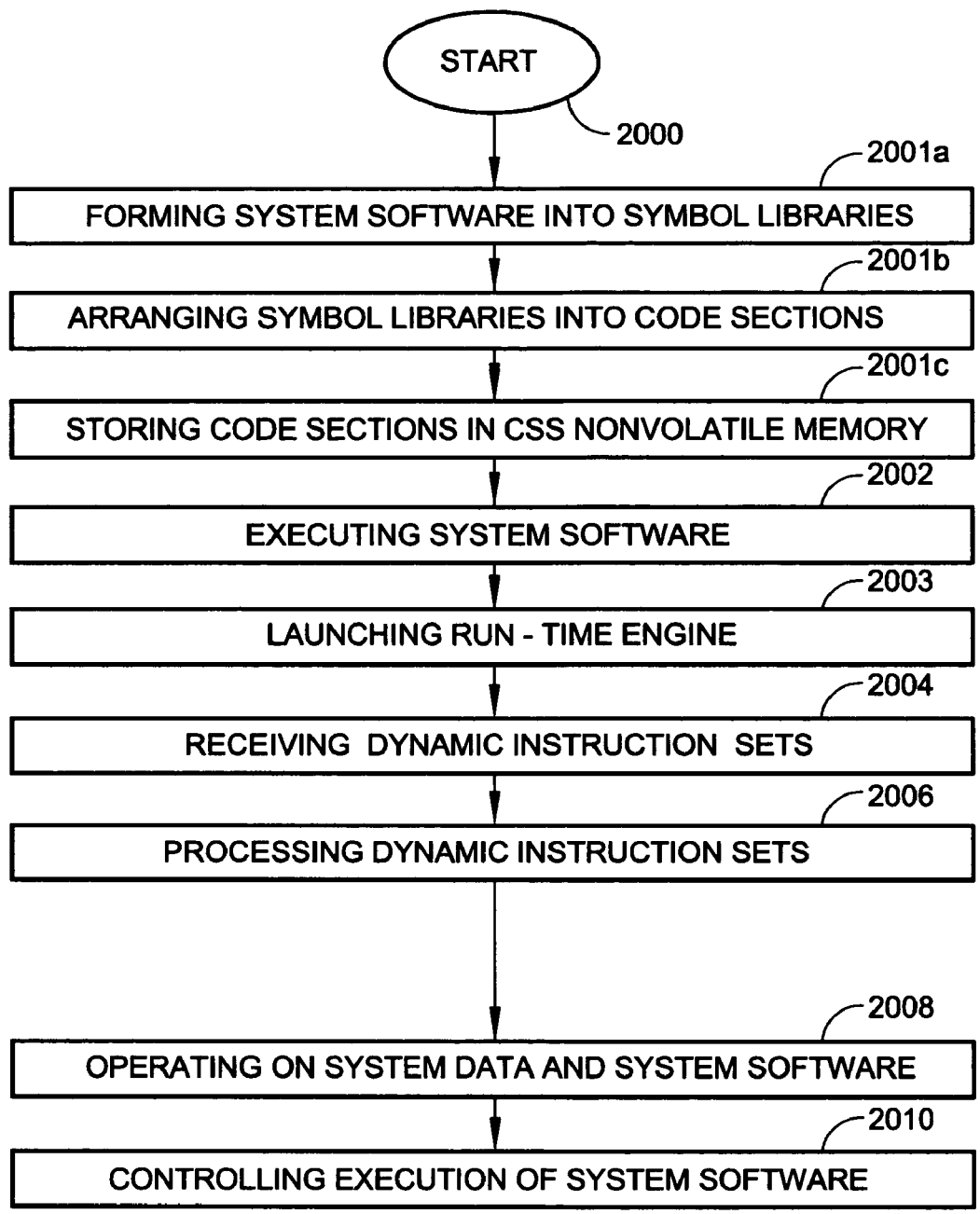
FIG. 20 is a flowchart illustrating a fifth exemplary dynamic instruction set operation.

FIG. 20 is a flowchart illustrating a fifth exemplary dynamic instruction set operation. Several of the Steps in FIG. 20 are the same as in FIG. 15, and are not repeated here in the interest of brevity. Step 2001c stores a plurality of code sections in a code storage section nonvolatile memory. Receiving patch manager run time instructions in Step 2003 includes receiving a new code section. Operating on the system data and system software in Step 2008 includes adding the new code section to the code storage section, and controlling the execution of the system software in Step 2010 includes using the new code section in the execution of the system software.

Alternately, receiving a new code section in Step 2003 includes receiving an updated code section. Then, operating on the system data and system software in Step 2008 includes replacing a fourth code section in the code storage section with the updated code section.

Figure 21:
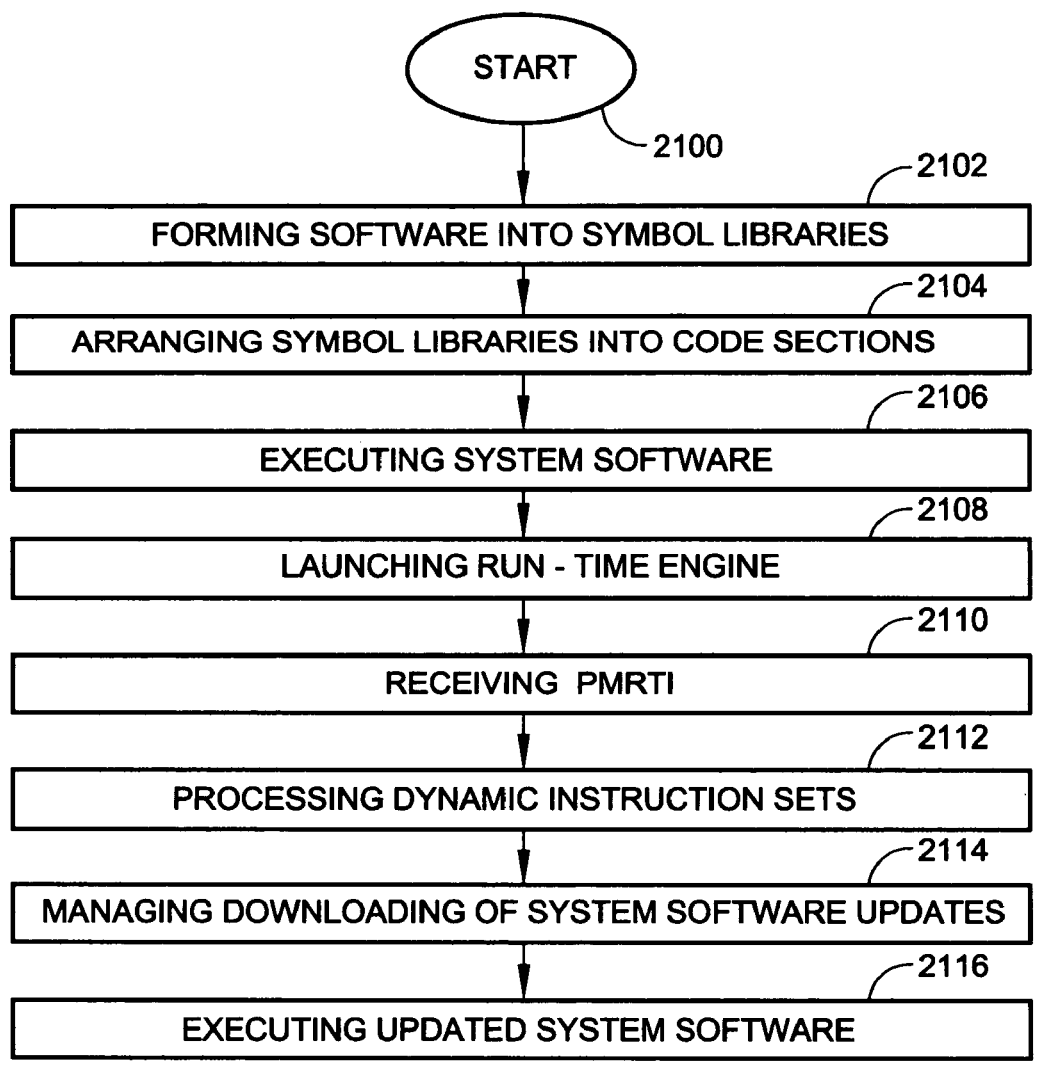
FIG. 21 is a flowchart illustrating the present invention method for managing system software download operations in a wireless communications device.

FIG. 21 is a flowchart illustrating the present invention method for managing system software download operations in a wireless communications device. The method starts at Step 2100. Step 2102 forms the system software into symbol libraries, each symbol library comprising symbols having related functionality. Step 2104 arranges the symbol libraries into code sections stored in a code storage section of nonvolatile memory. Step 2106 executes system software. Step 2108 launches a run-time engine. Step 2110 receives patch manager run time instructions (PMRTIs) in a file system section (FSS) nonvolatile memory, the patch manger run time instructions including dynamic instruction sets and new code sections. Step 2112 processes dynamic instruction sets. Step 2114, in response to processing the dynamic instruction sets, manages the downloading of system software updates received via an airlink interface. Step 2116 executes updated system software.

Managing the downloading of system software updates received via an airlink interface in Step 2114 includes processing dynamic instruction set management functions selected from the group including recovery status monitoring, back up, compacting, and update ordering.

Figure 22:
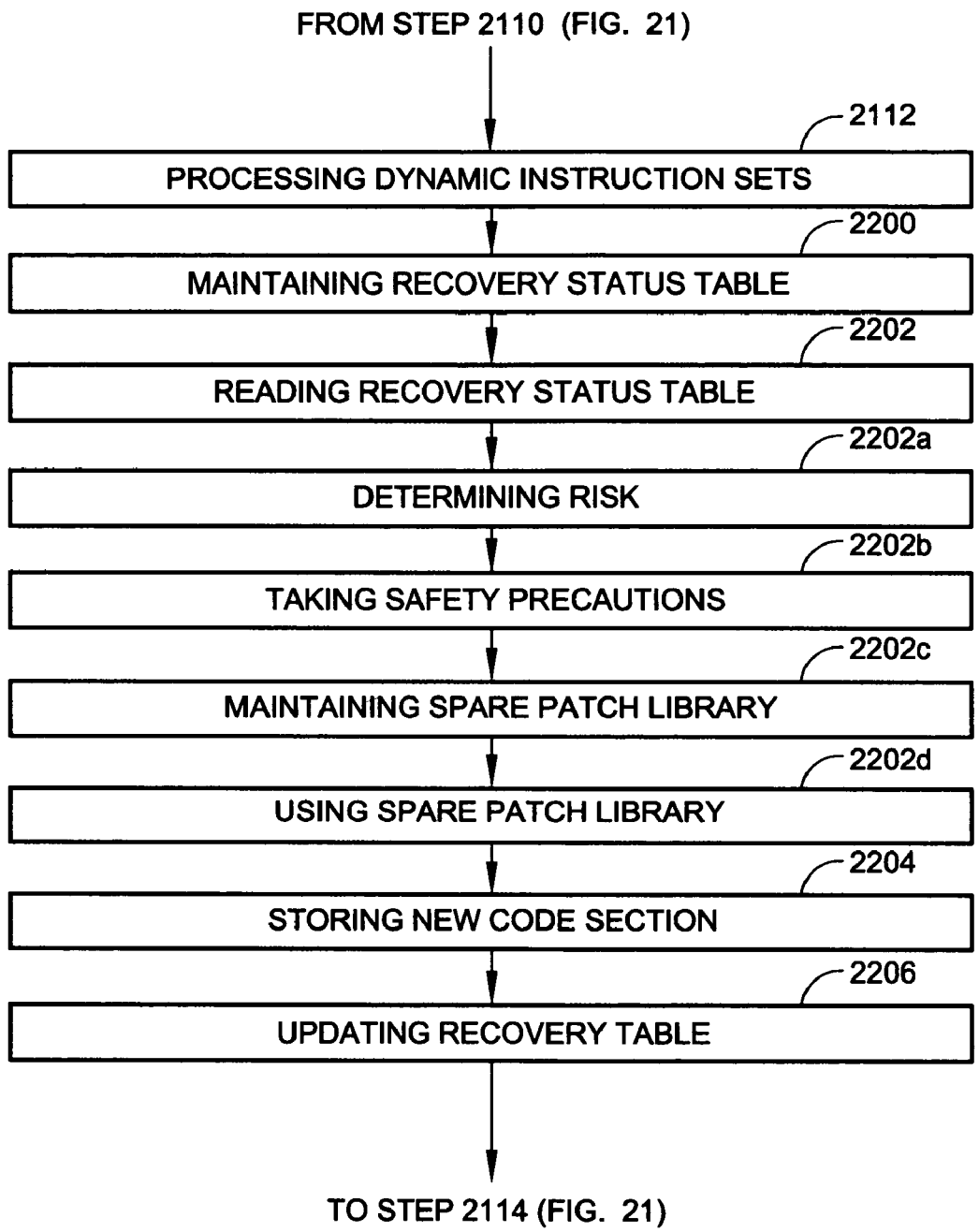
FIG. 22 is a flowchart illustrating additional details of FIG. 21 that highlight the recovery status monitoring aspect of the invention.

FIG. 22 is a flowchart illustrating additional details of FIG. 21 that highlight the recovery status monitoring aspect of the invention. Processing recovery status monitoring dynamic instruction sets in Step 2112 includes substeps. Step 2200 maintains a recovery status table cross-referencing new code section identifiers with their update status. Step 2202, in response to rebooting the wireless communications device, reads the recovery status table to determine if new code sections have been stored in permanent storage. Step 2204, if the new code sections have not been stored, stores the new code section in permanent storage. Step 2206 updates the recovery status table when the new code sections have been stored.

Some aspects of the invention include additional steps. Step 2202a determines the risk associated with storing each new code section. Step 2202b takes safety precautions if the risk of storing new code sections is high. Taking safety precautions in Step 2202b includes taking safety precautions selected from the group of checking the battery for sufficient power to complete the new code storing process, warning the user of high-risk code storing operations, using prompts to verify user-initiated power downs, and preventing user-initiated power downs.

Determining the risk associated with storing each new code section in Step 2202a includes determining the risk associated with new code sections selected from the group including a boot code section, a patch manager code section, a code section address table, a symbol offset address table, read-write data, and symbol accessor code addresses.

In some aspects of the invention, forming the system software into symbol libraries (Step 2102, see FIG. 21) includes forming a patch manager code section with a patch library for moving code sections in the file system section into permanent storage. Receiving the patch manager run time instructions in a file system section nonvolatile memory (Step 2110, se FIG. 21) includes receiving a new patch manager code section. Then, processing recovery status monitoring dynamic instruction sets includes further substeps. Step 2202c maintains a spare patch library in the file system section. Step 2202 reads the recovery status table to determine if the new patch manager code section has been successfully stored in the code storage section, in response to rebooting the wireless communications device. Step 2202d uses the spare patch library to move the new patch manager code section from the file system section to code storage section, if the new patch manager code section has not been successfully stored in the code storage section.

Figure 23:
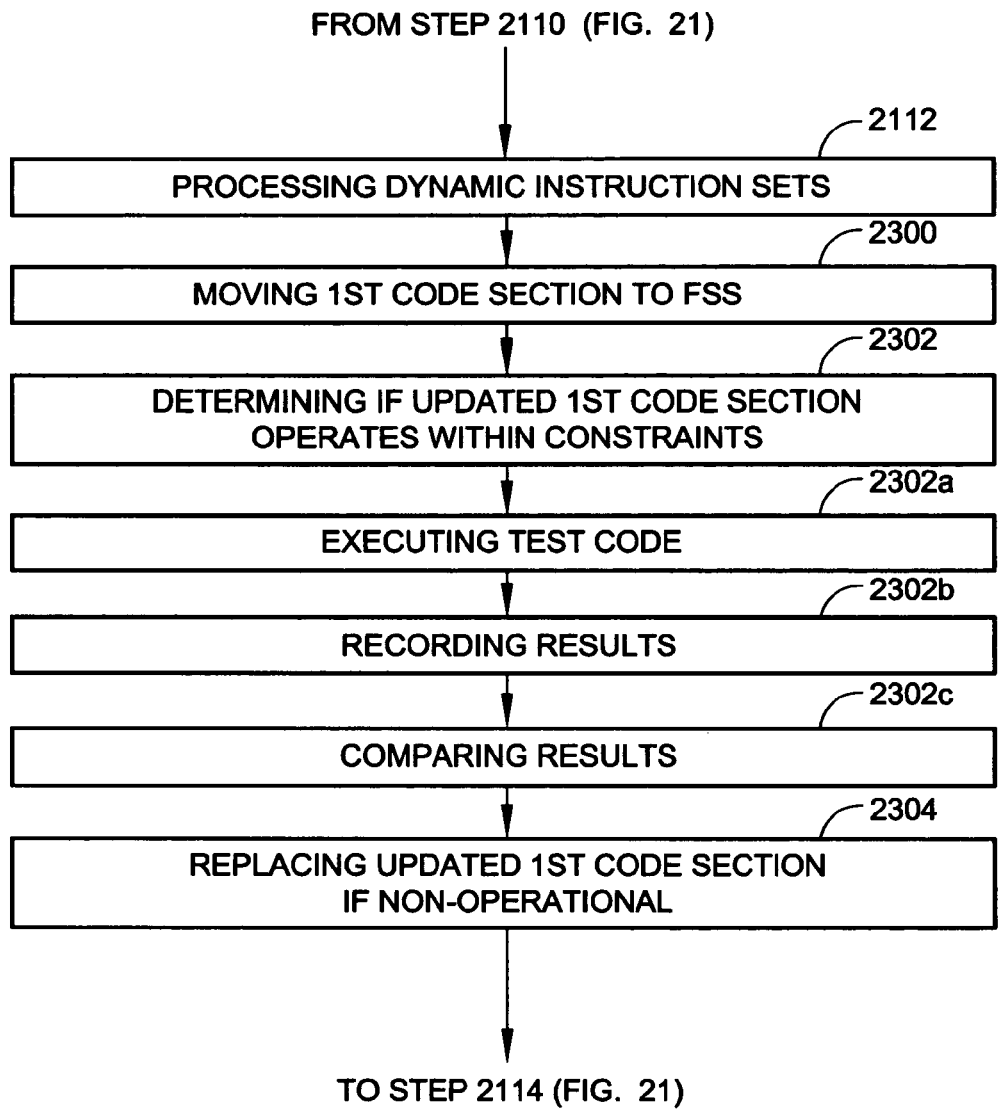
FIG. 23 is a flowchart illustrating additional details of FIG. 21 that highlight the back up aspect of the invention.

FIG. 23 is a flowchart illustrating additional details of FIG. 21 that highlight the back up aspect of the invention. Receiving new code sections (in Step 2110, see FIG. 21) includes receiving an updated first code section to replace a first code section in the code storage section. Then, processing back up management dynamic instruction sets in Step 2112 includes substeps. Step 2300 moves the first code section from the code storage section to the file system section. Step 2302 determines if the updated first code section in the code storage section operates with the system software within predetermined constraints. Step 2304 replaces the updated first code section in the code storage section with the first code section from the file system section, if the updated first code section is determined to not operate with the system software within the predetermined constraints.

In some aspects of the invention, receiving new code sections (Step 2110, FIG. 21) includes receiving a test code section with predetermined constraints. Then, determining if the updated first code section in the code storage section operates with the system software within predetermined constraints in Step 2302 includes substeps. Step 2302a executes the test code section with the updated code section. Step 2302b records the results of executing the test code section. Step 2302c compares the recorded results with the predetermined constraints.

In some aspects, receiving new code sections (Step 2110, FIG. 21) includes receiving an updated code section with a test code library. Then, determining if the updated first code section in the code storage section operates with the system software within predetermined constraints in Step 2302 includes executing the test code library from the updated code section. Receiving new code sections (Step 2110, FIG. 21) includes receiving a test code section with predetermined constraints from a source selected from the group including an airlink interface, a user operated keyboard interface, and a test port interface.

Figure 24:
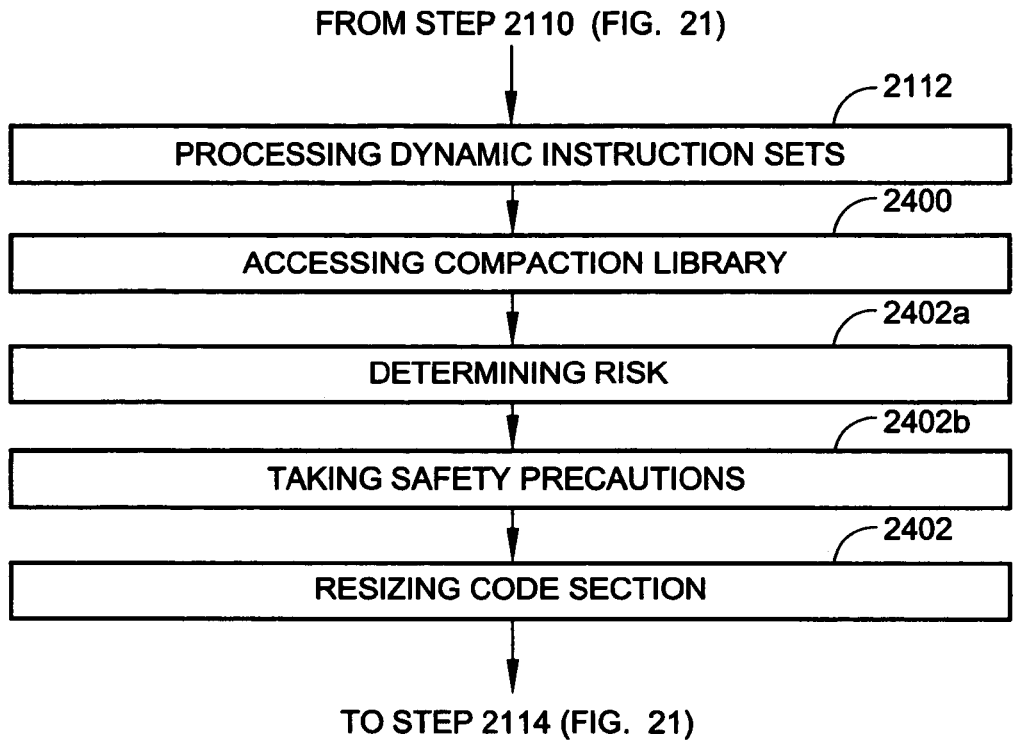
FIG. 24 is a flowchart illustrating additional details of FIG. 21 that highlight the compaction aspect of the invention.

FIG. 24 is a flowchart illustrating additional details of FIG. 21 that highlight the compaction aspect of the invention. Receiving new code sections (Step 2110, FIG. 21) includes receiving an updated first code section, having an updated code section size, to replace a first code section having a first size smaller than the updated first code section size. Processing compaction management dynamic instruction sets in Step 2112 includes substeps. Step 2400 accesses a compaction library in a patch manager code section. Step 2402 resizes code sections in the code storage section to accommodate the updated first code section.

In some aspects of the invention a further step, Step 2400a determines the risk associated with compacting code sections in the code storage section. Step 2400b takes safety precautions if the risk of compacting code sections is high. Taking safety precautions in Step 2400b includes taking safety precautions selected from the group of checking the battery for sufficient power to complete the new code storing process, warning the user of high-risk code storing operations, using prompts to verify user-initiated power downs, and preventing user-initiated power downs.

Figure 25:
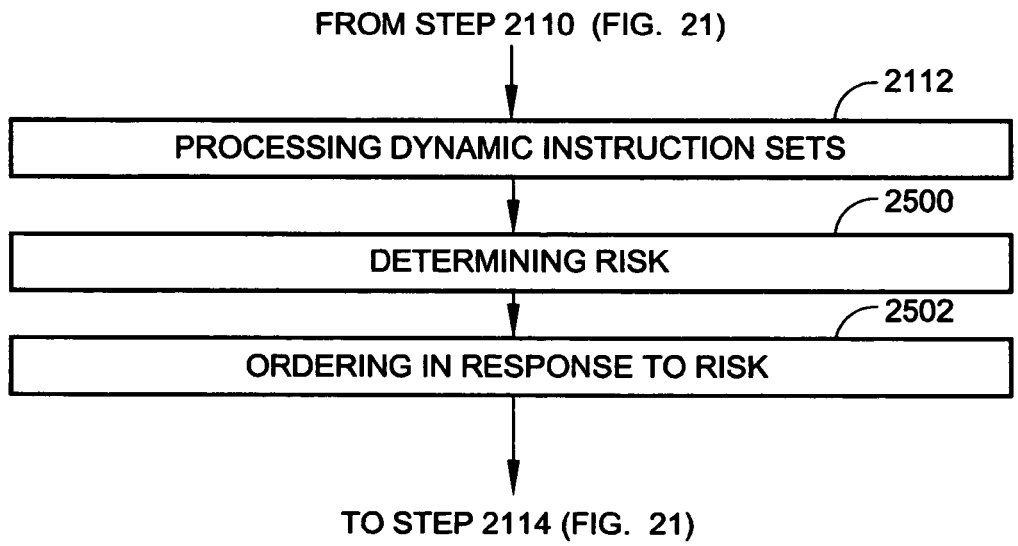
FIG. 25 is a flowchart illustrating additional details of FIG. 21 that highlight the update ordering aspect of the invention.

FIG. 25 is a flowchart illustrating additional details of FIG. 21 that highlight the update ordering aspect of the invention. Receiving dynamic instruction sets (Step 2110, FIG. 21) includes receiving an update ordering instruction, and receiving new code sections includes receiving a plurality of new code sections. Processing update ordering management dynamic instruction sets in Step 2112 includes moving the new code sections from the file system storage to the code storage section in an order dictated by the ordering instruction.

In some aspects of the invention, processing update ordering dynamic instruction sets in Step 2112 includes substeps. Step 2500 determines the risk associated with storing each new code section. Step 2502 orders the high risk code sections to be moved after lower risk storage sections.

A system and method have been provided for executing dynamic instruction sets in a wireless communications device, so as to aid in the process of managing the downloading of software upgrades. The system is easily updateable because of the arrangement of symbol libraries in code sections, with tables to access the start addresses of the code sections in memory and the offset addresses of symbols in the symbol libraries. The use on dynamic instruction sets permits custom modifications to be performed to each wireless device, based upon specific characteristics of that device. A few general examples have been given illustrating possible uses for the dynamic instructions sets. However, the present invention is not limited to just these examples. Other variations and embodiments of the invention will occur to those skilled in the art.

I claim:

1. In a communication system having a plurality of active wireless communications devices, a method for managing system software installation operations at each wireless communications device of the plurality of wireless communications devices, the method comprising:

identifying system software updates for a plurality of active wireless communications devices;

generating a dynamic instruction set configured to install the system software updates;

combining the system software updates with the dynamic instruction set to form a common software update file, wherein the common software update file is generated without inquiry to each wireless communications device;

receiving, at a particular wireless communications device of the plurality of wireless communications devices, the dynamic instructions sets and the system software updates in a broadcast message via an airlink interface;

executing the system software updates on the particular wireless communications device;

launching a run-time engine on the particular wireless communications device;

evaluating, using the run-time engine to execute the dynamic instruction set, current operational characteristics of the particular wireless communications device, wherein current operational characteristics comprise characteristics related to the system software updates;

conditionally using the system software updates on the particular wireless communications device according to the evaluation;

processing the dynamic instruction set using the run-time engine of the particular wireless communications device; and in response to processing the dynamic instruction set, functionally managing the installation of the system software updates received via the airlink interface to provide updated system software on the particular wireless communications device; wherein managing the installation of the system software updates received via the airlink interface includes processing dynamic instruction set management functions selected from the group including recovery status monitoring, back up management, compacting management, and update ordering management; and forming the system software into symbol libraries, each symbol library comprising symbols having related functionality; and arranging the symbol libraries into code sections stored in a code storage section of nonvolatile memory; and receiving patch manager run time instructions (PMRTIs) in a file system section (FSS) nonvolatile memory, the patch manager run time instructions including dynamic instruction sets and new code sections.

2. The method of claim 1 further comprising:
executing the updated system software on the particular wireless communications device.

3. The method of claim 1 wherein processing recovery status monitoring dynamic instruction sets includes:
maintaining a recovery status table cross-referencing new code section identifiers with their update status;
in response to rebooting the wireless communications device, reading the recovery status table to determine if new code sections have been stored in permanent storage;
if the new code sections have not been stored, storing the new code section in permanent storage; and, when the new code sections have been stored, updating the recovery status table.

4. The method of claim 3 wherein processing recovery status monitoring dynamic instruction sets further includes:
determining the risk associated with storing each new code section; and, if the
risk of storing new code sections is high, taking safety precautions.

5. The method of claim 4 wherein taking safety precautions includes taking safety precautions selected from the group of checking the battery for sufficient power to complete the new code storing process, warning the user of high-risk code storing operations, using prompts to verify user-initiated power downs, and preventing user-initiated power downs.

6. The method of claim 5 wherein determining the risk associated with storing each new code section includes determining the risk associated with new code sections selected from the group including a boot code section, a patch manager code section, a code section address table, a symbol offset address table, read-write data, and symbol accessor code addresses.

7. The method of claim 6 wherein forming the system software into symbol libraries includes forming a patch manager code section with a patch library for moving code sections in the file system section into permanent storage;
wherein receiving the patch manager run time instructions in a file system section nonvolatile memory includes receiving a new patch manager code section;
wherein processing recovery status monitoring dynamic instruction sets further includes:
maintaining a spare patch library in the file system section;
in response to rebooting the wireless communications device, reading the recovery status table to determine if the new patch manager code section has been successfully stored in the code storage section; and,
using the spare patch library to move the new patch manager code section from the file system section to code storage section, if the new patch manager code section has not been successfully stored in the code storage section.

8. The method of claim 1 wherein receiving new code sections includes receiving an updated first code section to replace a first code section in the code storage section:
wherein processing back up management dynamic instruction sets includes:
moving the first code section from the code storage section to the file system section;
moving the updated first code section from the file system section to the code storage section;
determining if the updated first code section in the code storage section operates with the system software within predetermined constraints; and, replacing the updated first code section in the code storage section with the first code section from the file system sections if the updated first code section is determined to not operate with the system software within the predetermined constraints.

9. The method of claim 8 wherein receiving new code sections includes receiving a test code section with predetermined constraints;
wherein determining if the updated first code section in the code storage section operates with the system software within predetermined constraints includes:
executing the test code section with the updated code section; recording
the results of executing the test code section; and, comparing the
recorded results with the predetermined constraints.

10. The method of claim 9 wherein receiving new code sections includes receiving an updated code section with a test code library; and,
wherein determining if the updated first code section in the code storage section operates with the system software within predetermined constraints includes executing the test code library from the updated code section.

11. The method of claim 9 wherein receiving new code sections includes receiving a test code section with predetermined constraints from a source selected from the group including an airlink interface, a user operated keyboard interface, and a test port interface.

12. The method of claim 1, wherein receiving new code sections includes receiving an updated first code section, having an updated code section size, to replace a first code section having a first size smaller than the updated first code section size;
wherein processing compaction management dynamic instruction sets includes:
accessing a compaction library in a patch manager code section; and,
resizing code sections in the code storage section to accommodate the updated first code section.

13. The method of claim 12 wherein processing compaction management dynamic instruction sets further includes:
determining the risk associated with compacting code sections in the code storage section; and,
if the risk of compacting code sections is high, taking safety precautions.

14. The method of claim 13 wherein taking safety precautions includes taking safety precautions selected from the group of checking the battery for sufficient power to complete the new code storing process, warning the user of high-risk code storing operations, using prompts to verify user-initiated power downs, and preventing user-initiated power downs.

15. The method of claim 1 wherein receiving dynamic instruction sets includes receiving an update ordering instruction, and wherein receiving new code sections includes receiving a plurality of new code sections; and,
   wherein processing update ordering management dynamic instruction sets includes moving the new code sections from the file system storage to the code storage section in an order dictated by the ordering instruction.

16. The method of claim 15 wherein processing update ordering dynamic instruction sets further includes:
   determining the risk associated with storing each new code section; and,
   ordering the high risk code sections to be moved after lower risk storage sections.

17. In a wireless communication device active in a wireless communication system having a server and a plurality of active wireless communication devices, a method for managing system software installation operations, the method comprising: identifying system software updates for a plurality of active wireless communications devices;
   generating a dynamic instruction set configured to install the system software updates;
   combining the system software updates with the dynamic instruction set to form a common software update file, wherein the common software update file is generated without inquiry to each wireless communications device;
   receiving the dynamic instruction set and the system software updates via an airlink interface;
   executing system software; wherein the system software is formed into symbol libraries, each symbol library comprising symbols having related functionality, arranged into code sections stored in a code storage section; and, the system further comprising:
      a file system section of nonvolatile memory receiving patch manager run time instructions (PMRTIs) including the dynamic instruction sets and new code sections;
   launching a run-time engine on the wireless communications device;
   evaluating, using the run-time engine to execute the dynamic instruction set, current operational characteristics of the wireless communications device;
   conditionally using the system software updates according to the evaluation;
   processing dynamic instruction set; and,
   in response to processing the dynamic instruction set, functionally managing the installation of the system software updates received via the airlink interface using management functions selected from the group including recovery status monitoring, back up, compacting, and update ordering.

18. In a wireless communications device, a system for managing system software download operations, the system comprising:
   an airlink interface;
   executable system software and system data differentiated into code sections stored in nonvolatile memory permanent storage; wherein the executable system software is formed into symbol libraries, each symbol library comprising symbols having related functionality, arranged into the code sections stored in a code storage section; and,
   a file system section of nonvolatile memory receiving patch manager run time instructions (PMRTIs) including dynamic instruction sets and new code sections; and
   the dynamic instruction sets include functional managers selected from the group including recovery status monitoring manager, back up manager, compacting manager, and update ordering manager;
   the dynamic instruction sets for locally managing the installation of system software updated received via the airlink interface, the system software updates being generated without inquiry to the wireless communication device, and
   a run-time engine for processing the dynamic instruction sets.

19. The system of claim 18 wherein the executable system software and system data are updated in response to processing the dynamic instruction sets.

20. The system of claim 18 further comprising:
   a recovery status table cross-referencing new code section identifiers with their update status; and,
   wherein the dynamic instruction set recovery status monitoring manager reads the recovery status table in response to rebooting the wireless communications device, to determine if new code sections have been stored in permanent storage, wherein the dynamic instruction set recovery status monitoring manager stores the new code section in permanent storage if the new code sections have not been stored and updates the recovery status table when the new code sections have been stored.

21. The system of claim 20 wherein the dynamic instruction set recovery status monitoring manager further determines the risk associated with storing each new code section and, if the risk of storing new code sections is high, takes safety precautions.

22. The system of claim 21 wherein the dynamic instruction set recovery status monitoring manager takes safety precautions selected from the group of checking the battery for sufficient power to complete the new code storing process, warning the user of high-risk code storing operations, using prompts to verify user-initiated power downs, and preventing user-initiated power downs.

23. The system of claim 22 wherein the file system section receives new code sections selected from the group including a boot code section, a patch manager code section, a code section address table, a symbol offset address table, read-write data, and symbol accessor code addresses; and,
   wherein the dynamic instruction set recovery status monitoring manager determines the risk associated with storing each of the new code sections in the file system section.

24. The system of claim 23 wherein the executable system software includes a patch manager code section with a patch library for moving code sections in the file system section into permanent storage;
   wherein the file system section receives patch manager run time instructions including a new patch manager code section; and,
   wherein the dynamic instruction set recovery status monitoring manager maintains a spare patch library in the file system section, reads the recovery status table to determine if the new patch manager code section has been successfully stored in the code storage section in response to rebooting the wireless communications device, and uses the spare patch library to move the new patch manager code section from the file system section to code storage section, if the new patch manager code section has not been successfully stored in the code storage section.

25. The system of claim 18 wherein the file system section receives an updated first code section to replace a first code section in the code storage section; and, wherein the dynamic instruction set back up manager moves the first code section from the code storage section to the file system section, moves the updated first code section from the file system section to the code storage section, determines if the updated first code section in the code storage section operates with the system software within predetermined constraints, and replaces the updated first code section in the code storage section with the first code section from the file system section, if the updated first code section is determined to not operate with the system software within the predetermined constraints.

26. The system of claim 25 wherein the file system section receives a test code section with predetermined constraints; and, wherein the dynamic instruction set back up manager determines if the updated first code section in the code storage section operates with the system software within predetermined constraints by executing the test code section with the updated code section, recording the results of executing the test code section, and comparing the recorded results with the predetermined constraints.

27. The system of claim 26 wherein the file system section receives an updated code section with a test code library; and, wherein the dynamic instruction set back up manager executes the test code library from the updated code section.

28. The system of claim 26 wherein the file system section receives the test code section from a source selected from the group including the airlink interface, a user operated keyboard interface, and a test port interface.

29. The system of claim 18 wherein the file system section receives an updated first code section, having an updated code section size, to replace a first code section having a first size smaller than the updated first code section size; and, wherein the dynamic instruction set compaction manager accesses a compaction library in a patch manager code section and resizes code sections in the code storage section to accommodate the updated first code section.

30. The system of claim 29 wherein the dynamic instruction set compaction manager determines the risk associated with compacting code sections in the code storage section and, if the risk of compacting code sections is high, takes safety precautions.

31. The system of claim 30 wherein the dynamic instruction set compaction manager takes safety precautions selected from the group of checking the battery for sufficient power to complete the new code storing process, warning the user of high-risk code storing operations, using prompts to verify user-initiated power downs, and preventing user-initiated power downs.

32. The system of claim 18 wherein the file system section receives a plurality of new code sections with the update ordering dynamic instruction sets; and, wherein the dynamic instruction set update ordering manager moves the new code sections from the file system storage to the code storage section in an order dictated by the ordering instruction.

33. The system of claim 32 wherein the dynamic instruction set update ordering manager determines the risk associated with storing each new code section and orders the high risk code sections to be moved after lower risk storage sections.

34. A system for updating system software for a plurality of operating wireless communications devices, comprising:

identifying a system software update for a plurality of operating wireless communications devices;

generating a dynamic instruction set configured to install the system software update;

combining the system software update with the dynamic instruction set to form a common software update file, wherein the common software update file is generated without inquiry to any one of the operating wireless communications devices of the plurality of operating wireless communications devices; wherein the common software update is formed into symbol libraries, each symbol library comprising symbols having related functionality, arranged into code sections stored in a code storage section; and, a file system section of nonvolatile memory receiving patch manager run time instructions (PMRTIs) including dynamic instruction sets and new code sections; and the dynamic instruction sets include functional management selected from the group including recovery status monitoring, back up management, compacting management, and update ordering management;

broadcasting the common software update file to each of the operating wireless communications devices of the plurality of operating wireless communications devices, each wireless communication device operating the steps of:

receiving the common software update file via an airlink interface;

launching a run-time engine;

evaluating, using the run-time engine to execute the dynamic instruction set, current operational characteristics of the wireless communications device;

conditionally using the common software update file according to the evaluation;

processing the dynamic instruction sets using the run-time engine; and in response to processing the dynamic instruction set, functionally managing the installation of the common software update file.

35. The system according to claim 34, wherein managing the installation includes processing the dynamic instruction sets to conditionally select sections of the software update file to install.

36. The system according to claim 34, wherein managing the installation includes processing the dynamic instruction sets to install the complete the software update file.

37. The system according to claim 34, wherein managing the installation includes processing the dynamic instruction sets to conditionally select additional sections stored on the wireless communication device to install, the additional sections not being in the received software update file.

* * * * *